(12) United States Patent
Gormish et al.

(10) Patent No.: US 8,504,624 B2
(45) Date of Patent: Aug. 6, 2013

(54) STROKE AND IMAGE AGGREGATION AND ANALYTICS

(75) Inventors: Michael J. Gormish, Redwood City, CA (US); John W. Barrus, Menlo Park, CA (US); Kurt W. Piersol, Campbell, CA (US); Kenneth F. Gudan, Sunnyvale, CA (US); Stephen R. Savitzky, San Jose, CA (US)

(73) Assignee: Ricoh Co., Ltd., Tokyo (JP)

( * ) Notice: Subject to any disclaimer, the term of this patent is extended or adjusted under 35 U.S.C. 154(b) by 790 days.

(21) Appl. No.: 12/555,675

(22) Filed: Sep. 8, 2009

(65) Prior Publication Data

US 2011/0057884 A1 Mar. 10, 2011

(51) Int. Cl.
*G06F 15/16* (2006.01)
(52) U.S. Cl.
USPC .......................................................... 709/206
(58) Field of Classification Search
USPC ........................................ 709/203, 206, 217
See application file for complete search history.

(56) References Cited

U.S. PATENT DOCUMENTS

| 7,218,779 | B2 * | 5/2007 | Dodge et al. | 382/177 |
|---|---|---|---|---|
| 7,509,321 | B2 * | 3/2009 | Wong et al. | 1/1 |
| 2005/0182777 | A1 * | 8/2005 | Block et al. | 707/100 |
| 2008/0236904 | A1 * | 10/2008 | Zukowski et al. | 178/18.03 |
| 2008/0250012 | A1 * | 10/2008 | Hinckley et al. | 707/5 |
| 2009/0112620 | A1 * | 4/2009 | Jung et al. | 705/2 |
| 2009/0327434 | A1 * | 12/2009 | Reynolds | 709/206 |
| 2010/0228854 | A1 * | 9/2010 | Morrison et al. | 709/224 |
| 2011/0029988 | A1 * | 2/2011 | Mittal et al. | 719/314 |

* cited by examiner

*Primary Examiner* — Phuoc Nguyen
(74) *Attorney, Agent, or Firm* — Patent Law Works LLP

(57) ABSTRACT

The present invention overcomes the deficiencies of the prior art with a system for stroke and image aggregation and analytics. The system is particularly advantageous because it provides a system for distributing page images such as worksheets, examinations or forms to multiple devices. The system allows independent paging and writing on the distributed materials; collection of the strokes added to the distributed pages images; and aggregating and displaying those strokes or summary information in a useful manner. For example, an instructor might receive the current work of the students for a particular examination question and view those strokes in a parallel manner or a combined manner.

20 Claims, 17 Drawing Sheets

STROKE AND IMAGE AGGREGATION AND ANALYTICS

BACKGROUND OF THE INVENTION

The present invention relates to distributed computing systems. More particularly, the present invention relates to distributed systems that process image and stroke data. Still more particularly, the present invention relates to systems and methods for stroke and image aggregation and analytics.

Pencil and paper have been a critical component of learning for a long time, in part because the interface does not burden the user when their cognitive load is already quite high. Students take notes on paper because paper can be written on anywhere, does not require power, areas can be crossed out or modified easily, and important notes can be emphasized with underlining. Paper and paper forms are easy to use and any required 'training' happens at a young age. The location of the paper itself reflects the state of workflow progression that has been completed. Similarly, distribution can be controlled such as handing out a test on paper to only those in the classroom. Paper also provides a medium upon which unique identifiers such as signatures, comments or sketches may be added. Forms are used ubiquitously throughout most office environments and are a critical part of conventional paper-based workflows. However, such paper-based workflows and conventional instruction using paper are not without their disadvantages. In particular, the distribution of forms especially across large distances and distributed offices is expensive, slow and requires copying. Furthermore, the availability of the paper form is limited and the cost for storage of completed forms processed by the workflow can be expensive.

There have been attempts in the prior art to replace paper with computing devices. For example, many students use personal computers for note taking in the classroom and there are various computer assisted instruction techniques. However, the noise from typing can be distracting to other students, and typing overhead can interfere with the cognitive learning process. While the computer can be advantageous for routine items such as drills and memorization, most computers do not allow the user to easily draw and make sketches. Computers typically do not provide an easy way for an instructor to see multiple students work, especially intermediate work.

There are some computing devices that have begun to be used in education such as electronic book readers. Such electronic book readers allow the user of the device to select content and download it. However, these devices typically do not allow the input of drawings, signatures, or handwritten notes. Other devices are specially designed to capture handwritten signatures. This is common for point-of-sale terminals where a signature is used to indicate agreement to pay and delivery services where a signature is used to indicate receipt of a package. These devices typically involve training for the delivery person or cashier and use proprietary back-end systems to control what is displayed and what happens after the signature is captured. These devices typically do not provide a way to display arbitrary content and capture responses. Other businesses use 'tablet PCs' which are essentially personal computers designed to accept input primarily from a stylus. These devices present the capabilities of a PC, with menus and file folders and arbitrary applications and try to make those capabilities easy to access with a stylus. Sometimes the user interface is customized for a particular purpose, for example, for medical charts. In this case the user does not need to learn to use a PC operating system, but must still learn the special purpose software. Such devices are typically only useful with the back-end system they were designed to be used with.

SUMMARY OF THE INVENTION

The present invention overcomes the deficiencies of the prior art with a system for stroke and image aggregation and analytics. The system is particularly advantageous because it provides a system for distributing page images such as worksheets, examinations or forms to multiple devices. The system allows independent page viewing and writing on the distributed materials; collection of the strokes added to the distributed pages images; and aggregating and displaying those strokes or summary information in a useful manner. For example, an instructor might receive the current work of the students for a particular examination question and view those strokes in a parallel manner or a combined manner.

In one embodiment, the system of the present invention includes: a plurality of portable computing devices coupled by a network to a stroke and image workflow server. The portable computing devices include a display, stroke capture capability and a wireless communication capability. The portable computing devices are adapted to receive images (e.g., forms), add stroke annotations to the received images, and send the annotated received images or the stoke annotations themselves. The stroke and image workflow server is coupled to the network for communication with the portable computing devices. The stroke and image workflow server includes an aggregation module and an analytics module for collecting strokes from the plurality of portable computing devices and for generating displays aggregating those strokes.

The present invention also includes a number of novel methods including a method for stroke and image aggregation and analytics, a method for stroke and/or image aggregation, a method for stroke and/or image filtering and presentation, and a method for stroke and/or image analytics in accordance with the present invention.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIGS. 9B-D are graphic representations of strokes captured and sent to a requesting portable computing system in an independent view and in accordance with the present invention.

DETAILED DESCRIPTION OF PREFERRED EMBODIMENTS

Figure 1:
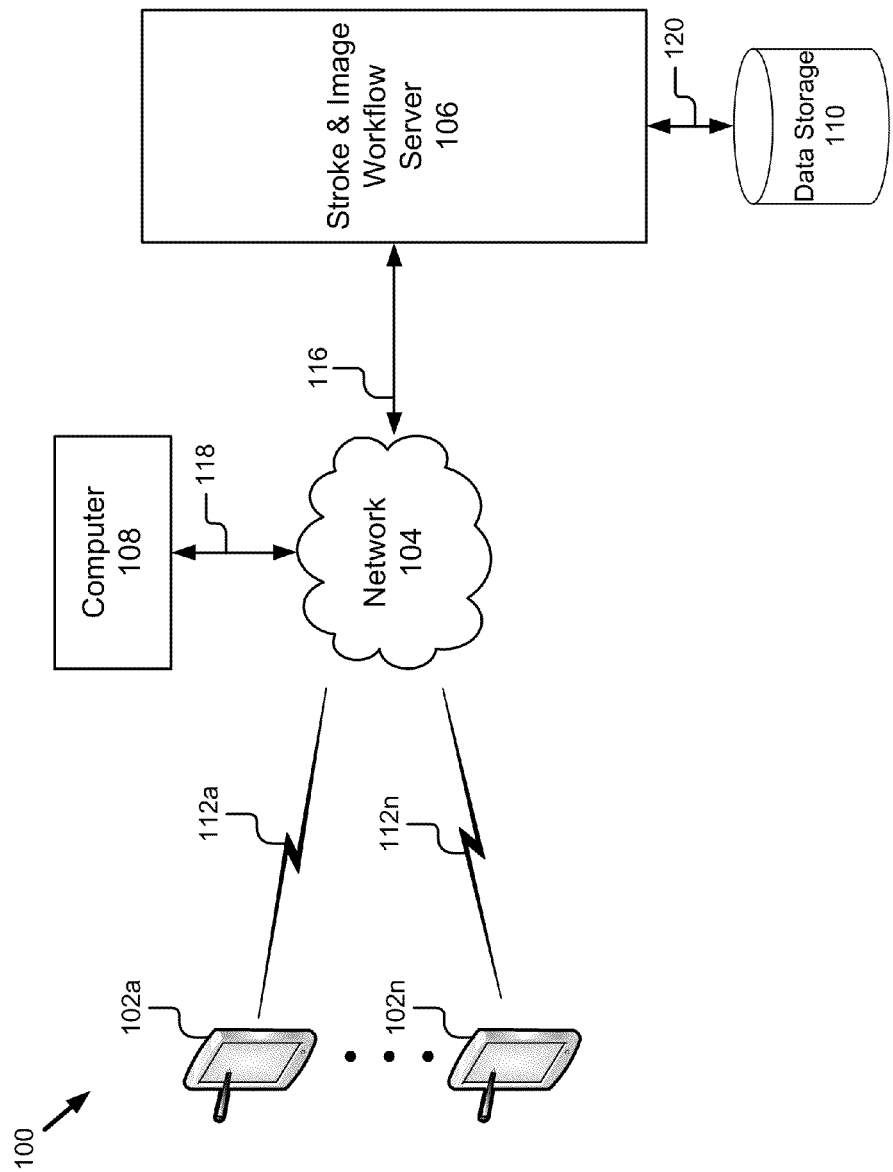
FIG. 1 is a block diagram of an embodiment of a system for stroke and image aggregation and analytics configured in accordance with the present invention.

Systems and methods for stroke and image aggregation and analytics are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to portable computing devices that are exemplified in a hardware and software platform such as Amazon Kindle. However, the present invention applies to any type of portable computing device that can capture ink, data and commands, and send documents electronically.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present invention is described below in the content of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is described with reference to a particular programming language. It will be appreciated that a variety of programming languages may be used to implement the teachings of the invention as described herein.

System Overview

FIG. 1 shows an embodiment of a system 100 for device enabled verifiable stroke and image based workflow. Referring now to FIG. 1, this embodiment of system 100 comprises: a plurality of portable computing devices 102a-102n, a network 104, a computer 108, a stroke and image workflow server 106 and data storage 110.

The plurality of portable computing devices 102a-102n is wirelessly coupled to the network 104 via respective couplings 112a-112n. In one embodiment, the portable computing devices 102a-102n are portable computing devices including a display, stroke capture capability and a wireless communication capability. The portable computing devices are adapted to receive images (e.g., forms), add stroke annotations to the received images, and send the annotated received images. Embodiments of the portable computing devices 102a-102n will be described in more detail below with reference to FIGS. 2 and 3.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc.

The computer 108 is a conventional type such as personal computer. The computer 108 is coupled to the network 104 by signal line 118. In one embodiment, the computer can access and communicate with the stroke and image workflow server 106 to initially input a form for processing or verify processing of a particular form according to workflow. For example, a user may use the computer 108 to input to the stroke and image workflow server 106 a document such as a PDF file for further processing. Similarly, the computer 108 may be the recipient of a completed form after all processing according to its workflow has been completed. Computer 108 may communicate with a workflow module 512 (See FIG. 5) of the stroke and image workflow server 106 to verify the status or completion of processing of a particular form. Finally, Computer 108 might operate on an electronic document as an intermediate stage of a workflow, or even contain some of the capabilities of the stroke and image workflow server 106, and communicate directly with portable computing devices 102a-102n.

The stroke and image workflow server 106 is coupled to the network 104 via signal line 116 for communication with the portable computing devices 102a-102n. The stroke and image workflow server 106 includes a document transmission module 508, a workflow module 512, a logging module 516, and a verification module 530 (See FIG. 5). The stroke and image workflow server 106 sends and receives documents from the portable computing devices 102a-102n, maintains a log for verification, and implements a paper like workflow and processing the documents. This is particularly advantageous because the stroke and image workflow server 106 implements paper like workflow for the portable device user and handles the overhead of processing electronic documents so that the processing is invisible to the user.

The data storage 110 is coupled to the stroke and image workflow server 106 via signal line 120. The data storage 110 is a non-volatile memory device or similar permanent storage device and media. Data storage device 110 stores data and instructions for processor 302 and comprises one or more devices including a hard disk drive, a floppy disk drive, a CD-ROM device, a DVD-ROM device, a DVD-RAM device, a DVD-RW device, a flash memory device, or some other mass storage device known in the art. The data storage 110 is used to store information about workflow processing such as the processing logs.

Although the system of FIG. 1 shows only one stroke and image workflow server 106, it should be understood that there could be any number of additional workflow servers, for example dedicated to other functions, companies, institutions, organizational structures. A computing pad 202 (See FIG. 2) may communicate with more than one stroke and image workflow server 106. Particular pages or sections of a compound document 400 (See FIG. 4) could be associated with different workflow servers. Thus the computing pad 202 might display a tax form that would be submitted to a governmental workflow server, and a medical form that would be submitted to a hospital workflow server, and a test that would be submitted to an educational workflow server when complete. The metadata directories can be used to specify the addresses for different pages or sections. Also, portions of a compound document 400 can be forwarded rather than sending the entire compound document. A student taking an exam might submit only the section with the work on the exam and not the pages with reference materials.

Portable Computing Device 102

Figure 2:
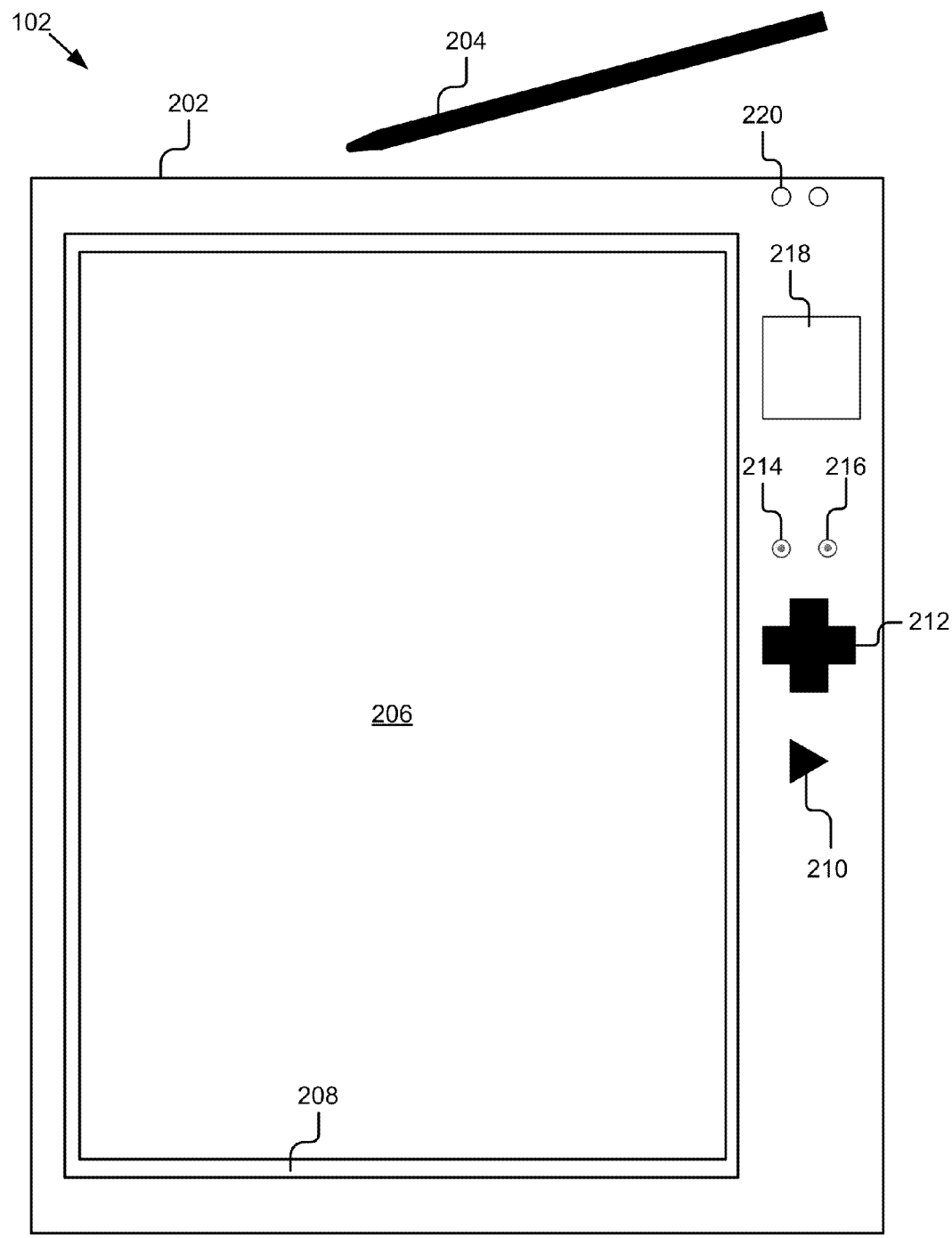
FIG. 2 is a front plan view of an embodiment of a portable computing device in accordance with the present invention.
Figure 3:
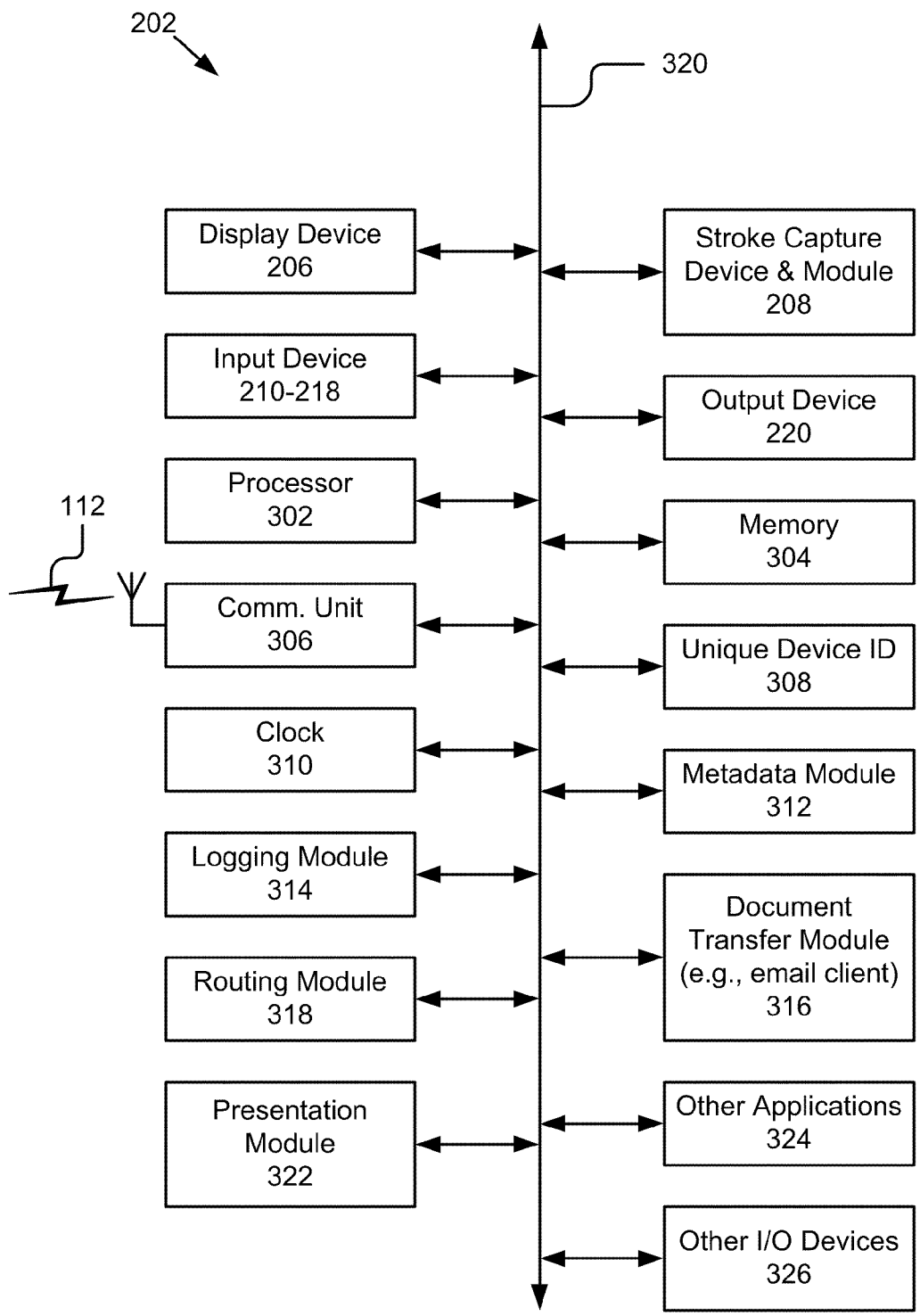
FIG. 3 is a block diagram of the embodiment of the computing pad in accordance with the present invention.

Referring now to FIGS. 2 and 3, an embodiment of a portable computing device 102 will be described in more detail. The portable computing device 102 comprises a computing pad 202 and a stylus 204. The computing pad 202 operation is to display an image and record any strokes written on the image. The strokes are typically displayed immediately on top of the image, just as if written by pen on paper. The strokes are also typically captured as a sequence of points or segments. Usually some timing information will be captured with the strokes and sometimes pressure information is captured. "Pen up" and "Pen down" may also be recorded with the strokes, indicating contact with the pad versus proximity to the pad. In some cases, the stylus 204 may have an identifier or a button or different "ends" and this can also be recorded with the strokes.

The computing pad 202 comprises a display device 206, a stroke capture device and module 208, a plurality of input devices 210-216, a camera 218, an output device 220, a processor 302, a memory 304, a communication unit 306, unique device identifier 308, a clock 310, a metadata module 312, a logging module 314, a document transfer module 316, a routing module 318, a bus 320, a presentation module 322, and other applications 324.

Referring now to FIG. 2, one embodiment for the computing pad 202 is shown. In this embodiment, the display device 206 is an electronic paper display such as manufactured and sold by E-ink. In other embodiments, the display device 206 is a liquid crystal display (LCD) or any other similarly equipped display device, screen, or monitor. The display device 206 represents any device equipped to display electronic images and data as described herein. The display device 206 is sized sufficient to show at least a small 'page' of information. In different embodiments, the display is binary (only two different values for pixels), monochrome (multiple shades of one color), or allows multiple colors and shades. The display device 206 is preferably a light-weight low-power display. In one embodiment, the display device 206 uses reflective light rather than emitting light for use outdoors and uses less power. The display device 206 also has high resolution for displaying information that might otherwise be displayed on paper, but the device display device 206 tolerates update speeds much lower than the 60 Hz refresh rates common with LCD displays.

Aligned with the display device 206, there is a stroke capture device 208 such as a digitizing tablet or graphics pad. The stroke capture device 208 is a contact sensing device or electromagnetic or light sensing devices with receivers that could be above, below, or around the display. The stroke capture device 208 is capable of accepting strokes from the stylus 204 or a finger or other implement. The stroke capture device 208 is a sensor for the stylus 204 and has resolution sufficient to capture recognizable handwriting and printing and other drawings. In one embodiment, display device 206 is equipped with a touch screen in which a touch sensitive, transparent panel covers the screen of display device 206. In one embodiment, the stroke capture device 208 is a digitizer manufactured and sold by Wacom Co., Ltd. In another embodiment, the stroke capture device 208 is simple sensors that return horizontal and vertical position of a single point of contact. In yet another embodiment, the stroke capture device 208 is a plurality of more complex sensors that return an indication of pressure, location, time, and even a stylus 204 ID number or type or indication if a button is pressed on a stylus or the stylus has been inverted, e.g. to erase. Some sensors might return multiple points of contact. The stroke capture device 208 is either part of or adapted to communicate with the stroke capture module 208.

In addition to the stylus 204, the computing pad 202 provides a plurality of input devices 210-216 to input commands. As shown in FIG. 2, a first button 214 when selected initiates the display of a compound document on the display device 206 of the computing pad 202. A second button 216 when selected indicates that annotation is complete and the compound document should be sent by the computing pad 202. A third button 212 allows the portion of a form that is being displayed to be moved within the display area of the display device 206. This button 212 allows the user to center the form or focus on other areas of the form and center them within the display area of the display device 206. A fourth input button 210 allows the user to transition to a next page of a compound document. Those skilled the art will recognize that these input devices as buttons are merely one embodiment for the plurality of input devices 210-216 and that various other configurations of fewer or more buttons or input devices are within the spirit and scope of the present invention. More specifically, in another embodiment, the computing pad 202 has very few (or no) buttons because buttons may interfere with the device being perceived as paper-like. In such an embodiment, strokes and other metadata will be continuously transmitted as long as there is network connectivity. The completion of a page or set of pages might be indicated by pressing a 'submit' or 'reject' button on the pad, or there may be regions on the displayed page and adding strokes to those regions may cause submission of the appropriate data. Those skilled in the art will recognize that are a variety of different number and configurations for the plurality of input devices 210-216. For example, another configuration includes 3 buttons for forward, backward, and submit; a second example has a slider to choose a page among a large number of pages depending on the position of the finger and one or more buttons.

The computing pad 202 includes a camera 218 and an output device 220 such as a series of LEDs. The camera is a conventional type such as those available on cell phones or notebook computers. The output device 220 indicates status of the device such as: 1) whether the computing pad 202 has power and is operational; 2) whether the computing pad 202 has network connectivity; 3) whether the computing pad 202 is sending or receiving a compound document; etc. Those skilled in the art will recognize that there may be a variety of additional status indicators beyond those listed above that may be part of the output device 220, or that status might be provided through the main display 206.

Referring now to FIG. 3, the remaining components of the computing pad 202 are described.

The processor 302 comprises an arithmetic logic unit, a microprocessor, a general purpose controller or some other processor array to perform computations, provide electronic display signals to display device 206, and detect and process stroke inputs. The processor 302 is coupled to the bus 320 for communication with the other components of the computing pad 202. Processor 302 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. The processing capability of the computing pad 202 may be limited to supporting the display of images and the recording strokes and the transmission of strokes. The processing capability might be enough to perform more complex tasks, including various types of image processing, stroke processing, or recognition tasks. It will be obvious to one skilled in the art that other processors, operating systems, sensors, displays and physical configurations are possible. The computing pad 202 also includes an operating system executable by the processor such as but not limited to WINDOWS®, MacOS X, or UNIX® based operating systems.

The memory 304 stores instructions and/or data that may be executed by processor 302. The instructions and/or data may comprise code for performing any and/or all of the techniques described herein. The memory 304 may be a dynamic random access memory (DRAM) device, a static random access memory (SRAM) device, flash memory or some other memory device known in the art. In one embodiment, the memory 304 also includes a non-volatile memory such as a hard disk drive or flash drive for storing log information on a more permanent basis. The memory 304 is coupled by the bus 320 for communication with the other components of the computing pad 202.

The communication unit 306 is coupled to an antenna and the bus 320. An alternate embodiment, the communication unit 306 may provide a port for direct physical connection to the network 104. The communication unit 306 includes a transceiver for sending and receiving compound documents. In one embodiment, the communication unit 306 includes a Wi-Fi transceiver for wireless communication with an access point. In another embodiment, the communication unit 306 includes a Bluetooth® transceiver for wireless communication with other devices. In yet another embodiment, the communication unit 306 includes a cellular communications transceiver for sending and receiving data over a cellular communications network such as via short messaging service (SMS), multimedia messaging service (MMS), hypertext transfer protocol (HTTP), direct data connection, WAP, email, etc. In still another embodiment, the communication unit 306 includes ports for wired connectivity such as but not limited to USB, SD, or CAT-5, etc. The communication unit 306 links the processor 302 to the network 104 that may include multiple processing systems. The network of processing systems may comprise a local area network (LAN), a wide area network (WAN) (e.g., the Internet), and/or any other interconnected data path across which multiple devices may communicate. The communication unit 306 also provides other conventional connections to the network 104 for distribution of files (media objects) using standard network protocols such as TCP/IP, HTTP, HTTPS and SMTP as will be understood to those skilled in the art.

The computing pad 202 includes storage for a unique device identifier 308. The computing pad 202 is coupled to the bus 320 to provide the unique identifier to other components as needed. In one embodiment, the storage is read only memory for storing the unique device identifier 308. In another embodiment, the unique identifier storage 308 is a nonvolatile storage storing a public key-private key pair. It is useful for the computing pad 202 to have a unique identifier that is used to indicate where strokes were recorded or for various communication protocols. In one embodiment, the unique identifier is the hardware MAC address of a network chip in the computing pad 202. The unique identifier 308 may be an internal part of another functional block, such as the communication unit 306, or in nonvolatile storage in memory unit 304. In another embodiment, the unique identifier is a unique ID associated with a memory card on the computing pad 202, in that way association with a particular device would move to a different device when the memory card is moved, which might be an expected behavior. Unique identifiers are useful for a variety of operations, but typically do not provide much security. Hardware MAC addresses for example can be imitated by other devices. Thus it is sometimes valuable to have a device associated with a pair of keys from a public key cryptography system, such as RSA®. In one embodiment, the computing pad 202 is manufactured with or configured with a private key and the public key disseminated. Then the computing pad 202 can use its private key for digital signatures of strokes, images, logs, or other media originating on the device. Others may use the public key to verify such media. The public key may also be used to provide secret communication with the device. Use of the device public key for encryption will limit the access of others to page images or metadata intended solely for a particular computing pad 202.

The clock 310 is a conventional type and provides an indication of local time for the computing pad 202. In particular, the clock 310 is used to provide a local time at which compound documents are processed. This time value is also stored with data in the local log files using the logging module 314. The clock 310 is adapted to communicate this information to the processor 302 and the logging module 314 using the system bus 320.

The metadata module 312 is software including routines for extracting metadata from a compound document and storing metadata to a compound document. In one embodiment, the metadata module 312 are instructions executable by the processor 302 to provide the functionality described below with reference to FIGS. 6A-11 for accessing both image/page metadata as well as document metadata. In one embodiment, the metadata module 312 is stored in the memory 304 and is accessible and executable by the processor 302. In any event, the metadata module 312 is adapted for cooperation and communication with the processor 320 and other components of the computing pad 202.

The logging module 314 is software including routines for creating and storing local logs in the memory 304, and more particularly, in a nonvolatile storage portion of the memory 304. In one embodiment the logging module 314 is a set of routines executable by the processor 302 to provide the functionality described below with reference to FIG. 6C and FIG. 10. The logging module 314 is particularly critical to provide verification of workflow completion in transactions. In one embodiment, the logging module 314 also includes routines for publishing or storing in a publicly available location on the network the logs of its particular computing pad 202. The logging module 314 is coupled by the bus 320 to the processor 302, the memory 304, and the communication unit 306.

The document transfer module 316 is software and routines for transmitting and receiving compound documents as a formatted message from any other computing device such as but not limited to the computer 108, the stroke and image workflow server 106 or other portable computing devices 102. The document transfer module 316 is coupled by the bus 320 for communication with the processor 302 and the communication unit 306. The document transfer module 316 is responsible for transmitting and receiving the compound document 400 from the computing pad such as by email, file transfer, XMPP or special purpose application. In one embodiment, the document transfer module 316 is an e-mail client that is capable of receiving and sending e-mails having attachments. The e-mail client is operable on the processor 302. Mail servers commonly use either the POP or IMAP protocols to talk to mail clients, and the computing pad 202 can be configured to use either. The messages might be in a format the computing pad 202 can directly use, e.g. an attachment of image files. The messages might be in a format that requires conversion on the computing pad 202, e.g. a pdf document. Alternatively, a special mail server could provide conversion of messages so that the pad does not need to support multiple formats. In the case of multiple devices being used in a workflow to distribute work that must only be done once e.g. as in the departmental in-box described above, using IMAP is advantageous. Multiple devices 102$a$-$n$ may be configured as clients with the same IMAP server and 'username.' The group of devices 102$a$-$n$ might display all forms in the "inbox." Once any user on any device 102$a$-$n$ marks the form as 'processed' the device moves the message out of the 'inbox' and perhaps into a 'processed' box on the IMAP server. When the other devices 102$a$-$n$ check the 'inbox' on the IMAP server, they will determine that the pages are no longer present and will no longer display them. When a pad needs to send a page or strokes or multiple pages and strokes, the pad can act as an email client and send mail, perhaps with the pages in a directory structure that has been compressed and combined into a single file.

In a second embodiment, the document transfer module 316 is a routine for performing file transfer. Various file transfer methods can be used to move documents on and off the computing pad 202. The computing pad 202 could run an ftp, http, or webdav server and other devices could push or pull documents on the computing pad 202. The computing pad 202 could also be configured to get or post new documents to an external server, again via ftp, http, rsync, webdav, or another protocol.

In a third embodiment, the document transfer module 316 is a client communication program such as for communicating via MMS or on other communications protocols. XMPP, a protocol used in instant messaging, is used to provide document and stroke communication with a pad. Instant messaging protocols are useful because any member of the messaging group can initiate a message, even while another member is transmitting a message. For the computing pads 202 this could allow a service to transmit an image for the pad at the same time as strokes are being transmitted from the pad to server. Instant messaging protocols can also be useful if a group of computing pads 202 is sharing a display space and thus all members of the group may be informed of new strokes.

In a fourth embodiment, the document transfer module 316 is a custom application. Of course, information may be transferred to the computing pad 202 with special purpose applications designed to work with the pad using a pad specific API. An instructor might want to "drag and drop" a worksheet onto a graphical representation of a pad without knowing the specific method used to move the file.

The routing module 318 is software including routines for determining future routing of a compound document. The routing module 318 determines the next step in a workflow process and creates and sends a compound document to the location determined to be the next step in the workflow process. The operation of the routing module will be described in more detail below with reference to FIGS. 4, 6A-D and 11. The routing module 318 is coupled by the bus 320 for communication with the processor 302, the memory 304 and a document transfer module 316.

The bus 320 represents a shared bus for communicating information and data throughout the computing pad 202. The bus 320 may represent one or more buses including an industry standard architecture (ISA) bus, a peripheral component interconnect (PCI) bus, a universal serial bus (USB), or some other bus known in the art to provide similar functionality. Additional components coupled to processor 302 through system bus 320 include the display device 206, the stroke capture device and module 208, the plurality of input devices 210-216, the output device 220, the processor 302, the memory 304, the communication unit 306, the unique device identifier storage 308, the clock 310, the metadata module 312, the logging module 314, the document transfer module 316, the routing module 318, the presentation module 322 and the other applications 324. There may also be a plurality of busses in computing system 202, designed to provide the most efficient communications between functional elements.

The presentation module 322 is software and routines for displaying the image portion of a compound document on the display device 206, and adjusting the display of the image responsive to input from input devices 210-216. In one embodiment, the presentation module 322 is a thin client routine executable by the processor 302 to cause display of the image on the display device 206. The presentation module 322 is coupled by the bus 320 to the display device 206, the processor 302, and the memory 304.

The other applications 324 include other software and routines executable by the processor 302 for various other types of functionality. In one embodiment, one or more application programs are executed by the processor 302 including, without limitation, word processing applications, electronic mail applications, financial applications, and web browser applications.

Finally, the computing pad 202 may include one or more other I/O devices 326. For example, the other I/O devices 326 may include speakers to produce sound, microphones to record sound, a scanner or camera to record documents or images, and other sensors or feedback devices like accelerometers, pager motors, or haptic feedback. Optionally, the other I/O devices 326 may include one or more analog-to-digital or digital-to-analog converters, and/or one or more digital signal processors to facilitate audio processing. These other I/O devices 326 are coupled by bus 320 for communication with the processor 302 and the memory 304. Optionally, a microcontroller may be added as part of other I/O Devices 326 to facilitate power systems control, as well as off-load the main processor 302 from lower-speed lesser-important tasks.

Compound Document 400 Format

The present invention utilizes a compound document 400 to provide a paper like workflow and experience for the user. In particular, the compound document format enables rapid display of images on the computing pad 202, storage of stroke data created on the computing pad 202, and storage of log information to enable verification of the operations performed on the computing pad 202. In one embodiment, the basic structure of the compound document 400 is a directory of files. Inside the directory are a series of page images, as well as optional metadata. The metadata may be associated independently with each page, and/or metadata may be associated with the document as a whole. Such metadata is stored in further nested directories, and is optional.

Figure 4:
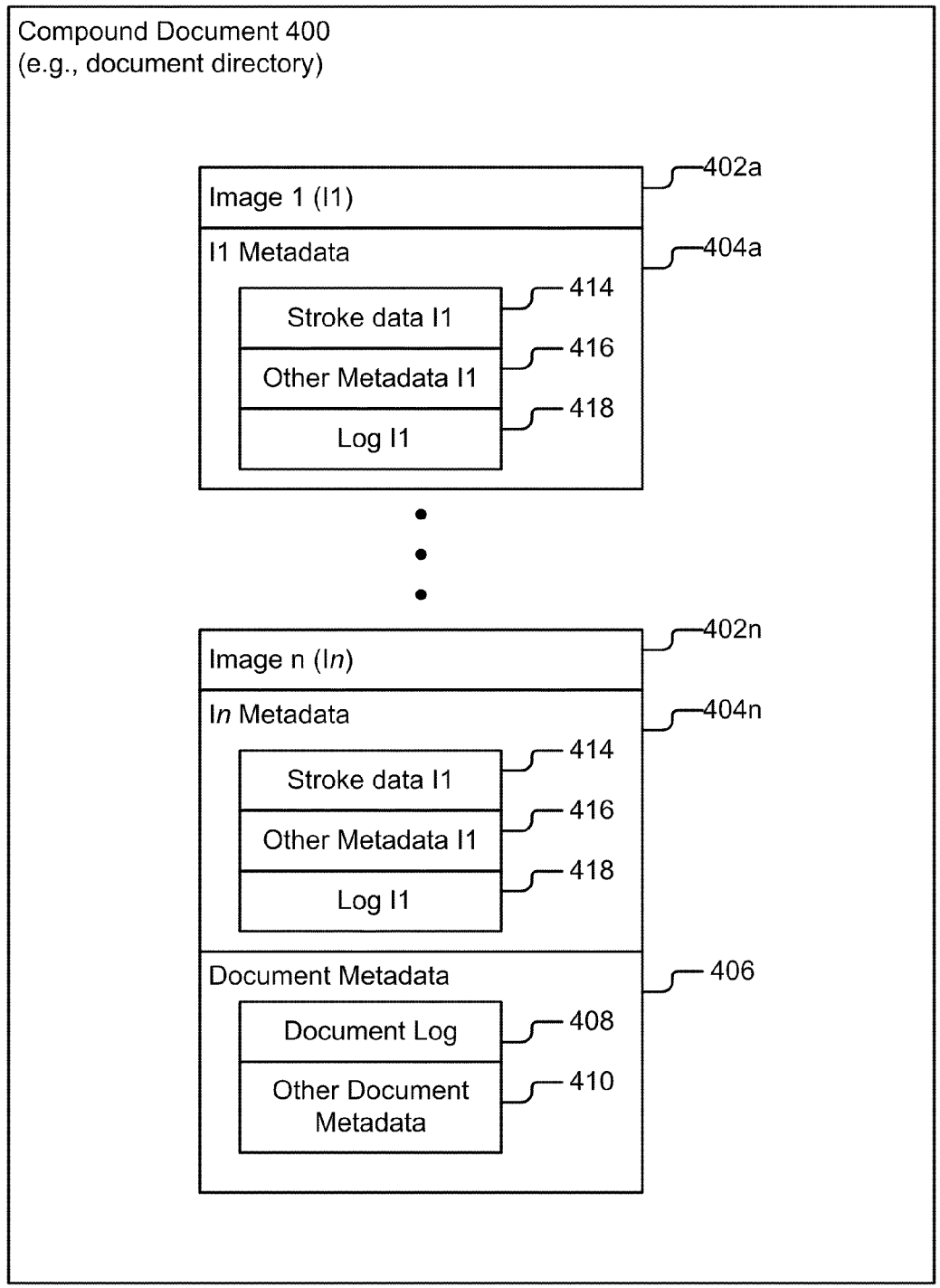
FIG. 4 is a block diagram representing an embodiment of a compound document in accordance with the present invention.

Referring now to FIG. 4, a graphic representation of the basic structure of the compound document 400 is shown. The compound document 400 as noted above is a directory including one or more files and directories. This is represented in FIG. 4 as the outermost box. In this example, the compound document 400 includes a plurality of images 402a-402n that are denoted in the figure as Image 1(I1) . . . Image n (In). The present invention advantageously stores the pages of the compound document 400 as images. This is particularly advantageous because it avoids requiring that the computing pad tool support a wide range of document formats. Providing pure images, i.e. not documents requiring rendering, to the computing pad 202 ensures a consistent view and eliminates problems with inability to render fonts or other graphical commands. In one embodiment, the images are in one of the following file formats: JPEG, JPEG2000, JPM, PNG, PDF, TIFF or simple PBM (portable bit map) file format. As will be described below, part of the process for creating a compound document 400 includes rendering documents and other formats to one of these simple image formats before the image is received by the portable computing device 102 or on the portable computing device 102. As noted above, the use of basic and simple images eliminates computation on the computing pad 202 and insures consistent display. Those skilled in the art will recognize that the compound document 400 directories can be transferred and stored as standard ZIP format archives.

In one embodiment, the mainstream pages of the compound document 400 are stored at the top level of the directory. The name segment (up to the initial ".") must be unique to that page. In one embodiment, pages are named using UTF-8. Pages may be ordered by sorting the initial name segments into ascending order, using the raw bytes of the UTF-8 representation. In some cases, applications may use document level metadata to allow reordering of pages without changing the names.

Multiple page image files which share the same initial name segment are considered to be alternate representations of the file, of equivalent quality, and the presentation module 322 may choose the representation most convenient for its use. So, for example, a directory with the following contents: 001.pgm, 001.png, 002.pgm, 002.jpg and 5.pgm would yield a document with three pages. The first page is represented by one of two files, 001.pgm or 001.png. The second page is represented by 002.jpg or 002.pgm, and the third page is represented by 5.pgm. In one embodiment, a segment of the name can be used to specify the resolution or size of any image to allow a device to easily choose an image. For example, there might be images page001.600x800.pgm and page001.cifpgm where 600x800 or cif (Common Intermediate Format) identifies the resolution of the images.

Each of the plurality of images 402a-402n may include associated page or image metadata 404a-404n. The page or image metadata 404a-404n includes stroke data 414, other metadata 416 and log data 418. Furthermore, the entire compound document 400 includes document metadata 406. The document metadata 406 includes a document log 408 and other document metadata 410.

The metadata for the compound document 400 is represented by files stored in directories, which are associated with either the document as a whole or with individual pages. In one embodiment, the metadata directories have the suffix ".d" as the final pair of characters in the directory name. Information within a metadata directory is stored in a file or subdirectory, which is expected to have a unique name segment. Organizations are encouraged to name them using unique identifiers—for example, the traditional Java reversed domain name method. A metadata directory may itself contain subdirectories, whose contents are ordered and defined according to the creator of that directory. General policy is that applications which do not understand the contents of a metadata file or directory should preserve the contents and should not alter it. A given metadata file or directory is self contained, there should not be any dependencies between items of metadata unless they are contained in the same directory. Items of metadata are connected either to the document as a whole, or a specific page.

In one embodiment, the document metadata 406 is global metadata and is stored in a directory containing one or more files, named "documented". This directory is included at the top level directory. It is useful to store a log of actions associated with a document in the document metadata. In one embodiment, the system 100 also stores a version of an "original" document as document metadata. For example if the compound document was formed from a PDF, Microsoft Word, Microsoft Excel or other document, the original format document may be saved in the metadata directory.

In one embodiment, the page or image metadata 404 is named with the same name segment as the page image, and ends in the extension ".d". For example, if the page image is named "page.001.jpg", the page metadata directory should be named "page.001.d" to indicate that it is associated with that page. In another embodiment, the page or image metadata 404 includes the original image in some format for each page in the page metadata directory. This metadata is created as soon as the compound document 400 is created e.g. by storing a raster format both at the top level directory and in the page metadata directory, or a copy of the original raster format may be stored when the page image is first changed. In other embodiments, the page or image metadata 404 includes log data 418 as will be discussed in more detail below. This log data 418 represents a log for changes applied to each page in the metadata directory for the page. The other metadata 416 is used to store any other data related to a particular page or image. For example, if images are added to a page, it is useful to store these added images in the page metadata directory 416. An image might be added to a page for reasons similar to "stamping" a paper page, e.g. "received" or "submitted" thus providing a visual indication of the status of the page to any reader.

The stroke data 414 stores stroke information for any strokes that are applied to a page in the page's metadata directory. This is the most important information captured by the computing pad 202. In the simplest form, a stroke is just a list of x-y locations where the stylus, pen or other pointing device, like a finger, was sensed. This information is associated with the background image that was showing when the strokes were written and it should be possible to scale and orient the strokes so that it is later possible to match what the user saw. In addition to the x-y locations, it can also be valuable to capture the time of each stroke or each point, the pressure of the stylus, which stylus was used or which end of a stylus was used (if the hardware supports this). It may even be useful to store information about the algorithm being used on the pen to convert pen strokes into pixels e.g. what width and color pen are lines being drawn in, and how are points selected between sensed points.

This information about strokes can be stored in a variety of ways. In a first embodiment, it is stored as simple text based lists comprising an x-value, a space, a y-value, and a line feed, with the end of a stroke indicated by a point outside the drawable space. For example, the pad might allow x coordinates between 0 and 1200 and y coordinates between 0 and 1600, a point recorded as "−1, −1" is not in the drawable space and can be used to terminate the stroke. In a second embodiment, strokes are stored as using a binary storage technique allocating the appropriate number of bits or bytes to each point, e.g. 2 bytes per x coordinate and 2 bytes per y coordinate, this is more memory efficient. In a third embodiment, the stroke data is stored as InkML. InkML is an XML format that allows storage of strokes and a variety of additional data, specified by the W3C and is described in the technical report, Ink Markup Language (InkML), W3C Working Draft 23 Oct. 2006. InkML allows some memory efficiency as well, and if necessary the data can be compressed by a text compressor.

Log Files 418

A particular advantage of the present invention is the ability to verify the actions performed by the portable computing devices 102 or the stroke and image workflow server 106. The ability to verify actions is enabled by the creation and maintenance of log files 418. The present invention creates a log or log file with a set of entries that describe changes made to a compound document 400. The present invention records any actions instigated by a human on a computing pad 202 which resulted in a changed appearance to the displayed document. Since the computing pad 202 is used to allow humans to write on a document as if it was paper, it is useful to record what writing was done on what pages at what time on what device and if known by whom and in what location. The present invention utilizes log files 418 with two important properties: 1) sufficient information is referenced by the log to recreate the state of the document, at minimum its visual appearance at the point of log writing and 2) the log file is "tamper evident."

The present invention generates logs that are tamper evident by maintaining a sequence of cryptographic hashes of log entries. The cryptographic hashes associated with each log entry hash data including the cryptographic hash of the previous log entry. Storing or publishing the cryptographic hash provides a checksum for all previous entries in the log. Thus if the published hash is "trusted" then it is possible to re-compute all previous log hashes and see if the same final hash results. Changes to any part of the log or any of the data that was hashed to make a log entry can be detected. The format and details for hash computation and verification of such logs and log entries are described in co-pending U.S. patent application Ser. No. 11/322,435 filed on Dec. 29, 2005, titled "Coordination and Tracking of Workflows;" U.S. patent Ser. No. 12/244,714, filed on Oct. 2, 2008, titled "Method Apparatus for Tamper Proof Camera Logs;" and U.S. patent application Ser. No. 10/887,998, filed on Jul. 9, 2004 and titled "Synchronizing Distributed Work Through Document Logs," which are incorporated by reference in their entirety. The cryptographic hashes are also called content based identifiers (CBIs) because they can be used to index data in addition to use for verification. The publication of the most recent cryptographic hash can be to other trusted logs or via email as described in U.S. patent application Ser. No. 12/224,707, filed on Oct. 2, 2008, titled "Method and Apparatus For Risk Analysis of Entangled Logs" and U.S. patent application Ser. No. 12/244,721, filed on Oct. 2, 2008, titled "Method & Apparatus for Automatically Publishing Content Based Identifiers" which are incorporated by reference in their entirety. Thus logs containing cryptographic hashes or content based identifier (CBI) are maintained. The content based identifier (CBI) of the recent log entries are stored in other log files and published via email or other protocols. These CBIs can later be used to verify that the log was not modified since the time the CBI was published.

Maintaining logs which allow recreation of the document at any point is done by storing the type of operation performed on the document and the CBI for any data needed to redo the operation in the log file. The data itself is stored in metadata directories for the page and document.

The logging module 314 stores information about changes on a page such as: page creation, writing on a page, and adding an image to a page. The logging module 314 also stores when a page is submitted or otherwise copied from the computing pad 202 to another place. When a page is created a raster form of the image is saved in the metadata directory for the page. The page log 418 is initialized with a 'start log entry.' The start log entry includes the current time as measured on the computing pad 202 and might include a CBI from another log to establish that the page was created after the time of that CBI (this is a 'freshness hash'). In addition to the 'start log entry,' the logging module 314 stores a 'page created' entry that includes the hash of the raster form of the starting image.

If the CBI of the page log 418 is published after the page is created, then it is possible to use that CBI to check if the page log 418 has been tampered with. If the page log 418 has not been modified, then the steps in the log 418 can be followed. At first the only entry is the 'page created' entry. The CBI for the page image can be checked, and if it matches the raster image in the page metadata directory 404, then the format of the initial page is known not to have been tampered with since creation.

When strokes are added to page, they are displayed in raster format on the display device 206, and they are stored in a stroke file 414 in the metadata directory 404 for the page. A log entry is added to the page log 418, typically including the time and the CBI for the stroke file 414. Thus at a later point, if the log 418 is verified, then the stroke file 414 can be verified and the background image can be verified, if all of these items have not been modified then the stroke file 414 can be used to redraw the strokes on the background image, thus recreating the page as it looked after strokes were added.

Note that to maintain pixel accuracy, the present invention uses a known algorithm to convert the stroke file 414 to pixels. If multiple algorithms are used, or an algorithm is used with some parameters, e.g. stroke width, then the entry for 'strokes added' should include information identifying the exact algorithm used and the parameters to that algorithm.

Just as strokes may be added to a page, images may be added to a page. In this case the image added to a page should be stored in raster format in the page metadata directory 404. The operation 'image added' and the location and scale used to add the image e.g. (500,300) should be stored in the log 418, along with the CBI of the raster form of the image.

Many "applications" can operate on the computing pad 202 that only update pages by adding images or adding strokes. If additional changes are made to the page then log entries for these operations must be defined, the name of the operation must be stored in the log, and the hash of the data must be stored in the log. When a log entry is added to a log 418 the unique identifier 308 of the computing pad 202 is included in the entry. If a device is configured with a private key, then it might provide a digital signature of the stroke file 414 to indicate that the stroke file 414 was captured on that computing pad 202. This signature is included in the log 418.

Just as a page log 418 is created in a metadata directory 404 when a new page is created, the logging module 314 creates a document log 408 in the document metadata directory 406 when a document is formed. This document log 408 is used to record items including the addition of pages to a document, when pages are viewed, and when the document as a whole is submitted. Also changes to document level metadata 406 are recorded in this document log 408. While it is possible to repeat the information stored in a page log 418 in the overall document log (along with a page identifier), the logging module 314 records just the CBI for the last entry in page log 418 when the page log 418 is updated. By storing the CBI from the page log 418 in the document log 408, the document log 408 is used to verify all the page logs 418. The CBI from the document log 408 is then published by email or other method, rather than needing to publish information from each individual page log 418.

Entries in the document log 408 are similar to the page logs 418: they should include an 'operation' and the CBI of any data necessary to complete the operation. In the case of a page view, the log entry includes the identifier for the page, along with the CBI of the current raster format of the page image. Note that some log formats allow the direct inclusion of text and CBIs in the same log entry, while other log formats only allow CBIs. In the event the log format only allows CBIs, the text for the 'operation' is stored in a file in the document metadata directory 406 and the CBI of that file included in the log. When the 'operation' has no parameters, e.g. 'strokes added' then the same file with the text of the operation can be stored once in the metadata directory and the CBI used multiple times. Of course the CBI of the actual stroke file is expected to differ in most cases.

Stroke and Image Workflow Server 106

Figure 5:
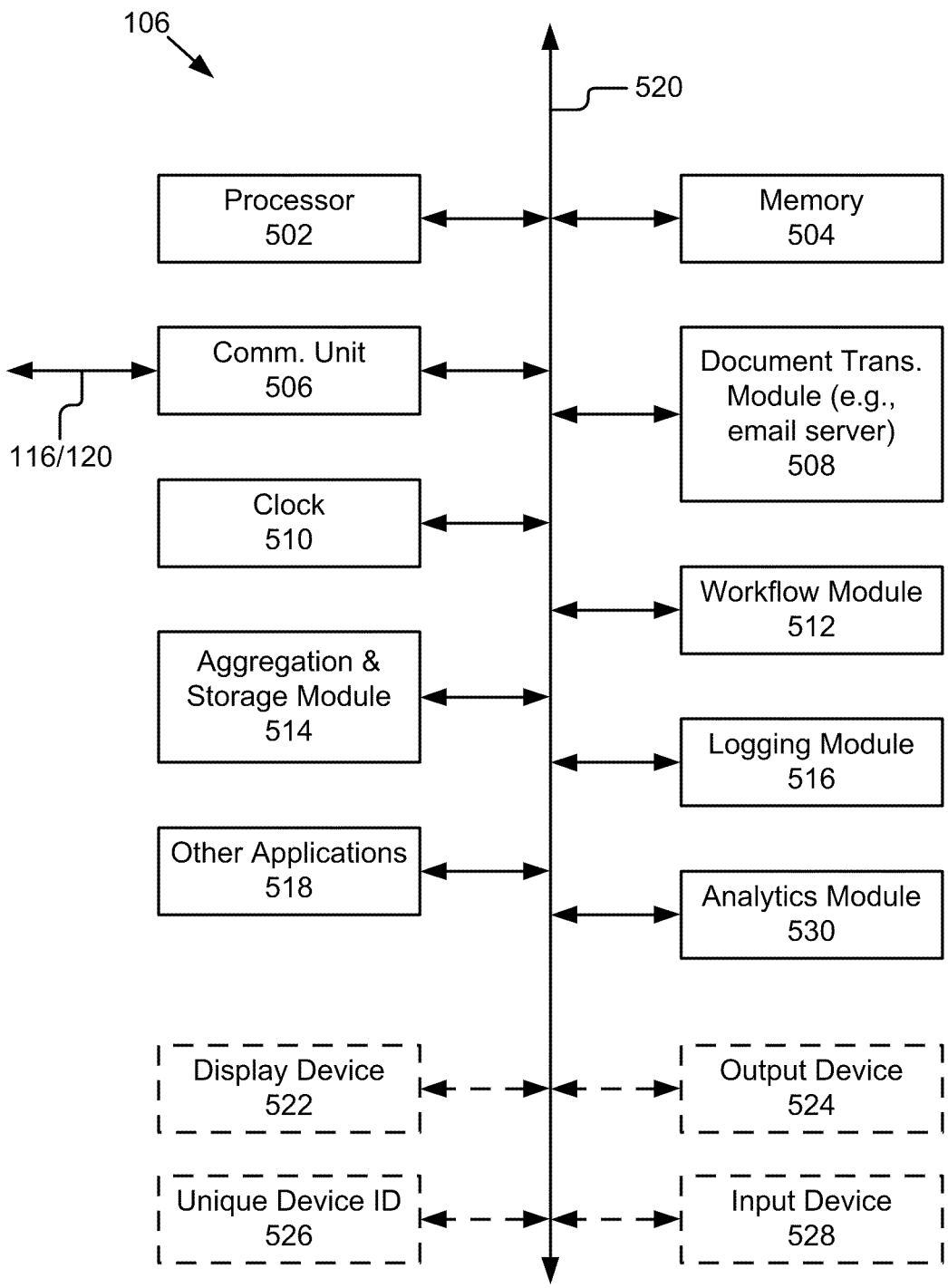
FIG. 5 is a block diagram of an embodiment of a stroke and image workflow server in accordance with the present invention.

Referring now to FIG. 5, an embodiment of a stroke and image workflow server 106 will be described in more detail. The stroke and image workflow server 106 comprises a processor 502, a memory 504, a communication unit 506, a document transfer module 508, a clock 510, a workflow module 512, an aggregation and storage module 514, a logging module 516, other applications 518, a bus 520 and an analytics module 530. In an alternate embodiment, the stroke and image workflow server 106 further comprises a display device 522, an output device 524, a unique device ID storage 526 and an input device 528.

Those skilled in the art will recognize that some of the components of the stroke and image workflow server 106 have the same or similar functionality to the components of the computing pad 202 so descriptions of these components will not be repeated here. For example, the processor 502, the memory, 504, the communication unit 506, the document transfer module 508, the logging module 516, the clock 510, the other applications 518, display device 522, output device 524, unique device ID 526 and input device 528 have a similar functionality to the processor 302, the memory 304, the communication unit 306, the document transfer module 316, the logging module 314, the clock 310, the other applications 324, display devices 206, output device 220, unique device ID 308, input devices 210-216 of FIG. 3, respectively. Some differences between the components of the stroke and image workflow server 106 and the computing pad 202 are noted below. For example, the communication unit 506 may couple the stroke and image workflow server 106 to a network in a wired manner instead of wirelessly. The processor 502 is more computationally powerful than the processor 302 as the workflow server 106 likely services numerous portable computing devices 102. The document transfer module 508 is an e-mail server as opposed to an e-mail client. The display device 522 may be a CRT, and the output device 524 is speakers. The input device 528 includes a keyboard and mouse type controller. Those skilled in the art will recognize that there may be a variety of other differences as the components of the stroke and image workflow server 106 acts as a hardware server as opposed to a remote client.

The workflow module 512 of the stroke and image workflow server 106 is software and routines for processing and routing compound documents. The workflow module 512 creates compound documents 400 and creates formatted messages. The workflow module 512 also works with the logging module 516 to create a system log(stored in the logging module 516, the memory 504 or the data storage 110) and publishes or makes available that log as needed. The workflow module 512 is also responsible for routing formatted messages on to the next location as part of a processing workflow. In one embodiment this function is provided by the routing module 318 of the computing pad 202. In another embodiment, the computing pad 202 sends reply emails to the stroke and image workflow server 106, and the workflow module 512 determines the routing and next workflow step. It should be noted that the process of creating a system log by the workflow module 512 can create a log entanglement as noted above, and that the presences of multiple workflow modules 512 servicing distinct pages of the document greatly increases the difficulty of tampering with the document without being detected. In one embodiment, the workflow module 512 includes a verification module (not shown) for verifying the processing of a compound document 400. In one embodiment, the verification module is routines executable by the processor 502 to perform verification of document processing as described below with reference to FIG. 6D. The verification module is coupled by bus 520 to the processor 502, the memory 504 and the communication unit 506. Note that the verification module might be used independently of the stroke and image workflow server 106. In fact, it might run on the computer 108 for independent verification of documents without need to trust a particular server.

The aggregation and storage module 514 is software and routines for processing stroke and/or images received by the document transfer module 508 via the communication unit 506. In one embodiment, the aggregation and storage module 514 processes compound documents 400 received by the document transfer module 508. In another embodiment, the aggregation and storage module 514 processes formatted messages including strokes. In either embodiment, the aggregation and storage module 514 extracts strokes and/or images from the compound documents 400 or formatted messages and makes them available for further processing by the analytics module 530. The aggregation and storage module 514 is also responsible for storing the strokes and/or images. This storage is done using the aggregation and storage module 514, the memory 504 or the data storage 110. The operation of the aggregation and storage module 514 is described in more detail below with reference to FIGS. 7 and 10-12. The aggregation and storage module 514 is coupled to the processor 502 and memory 504 by bus 520.

The analytics module 530 of the stroke and image workflow server 106 is software and routines executable by the processor 502 for analyzing strokes and/or images, and creating a variety of displays for strokes and images. The analytics module 530 is described in more detail below with reference to FIGS. 7, 9A-9E, 11 and 12. The analytics module 530 is coupled by bus 520 to the processor 502, the memory 504 and the aggregation and storage module 514.

While the aggregation and storage module 514 and the analytics module 530 are described here as being part of the stroke and image workflow server 106, those skilled in the art will recognize that in alternate embodiments, the aggregation and storage module 514 and the analytics module 530 are part of a computing pad 202. In particular, this embodiment is shown below with reference to FIG. 8A in which one computing pad 802 communicates with the remaining computing pads 804*a-n* to send images, receive strokes and then return adjusted images.

Workflow Specification

Depending on the embodiment, much of this functionality is performed either by the workflow module 512 of the stroke and image workflow server 106 or by the routing module 318 of the computing pad 202. For convenience and ease of understanding, it is described below as being performed by the routing module 318 of the computing pad 202; however, those skilled in the art will recognize that alternatively the same operations may be performed by the workflow module 512 of the stroke and image workflow server 106.

Those skilled in the art will recognize that there are a variety of ways that the routing module 318 of the computing pad 202 determines what to do with the strokes recorded on a page and when these strokes should be submitted to the next step in a workflow. How the routing module 318 of the computing pad 202 handles a completed page depends on how the pad is configured and how the page information was received.

In one embodiment, computing pads 202 are configured to work with a particular stroke and image workflow server 106 and submit a page to the stroke and image workflow server 106 for that page, the stroke and image workflow server 106 then determines the next step based on preprogrammed rules.

In another embodiment, workflows are specified in the compound document 400 or in the email (formatted message) in which the compound document 400 was sent. In the simple case of receiving a compound document 400 by email, the computing pad 202 returns the completed compound document 400 by email to the sender of the compound document 400. A better practice is to send the compound document 400 to the address specified in the "Reply-To:" email header if one is provided, just as would happen if "Reply" was selected in typical email clients. Most email clients enable the sender to specify a "Reply-To" address. This allows one person to fill out a form and send it to a different computing pad 202 with the "Reply-To" header set to the next person/device/location that should see the compound document 400 after it has been approved by the user of the computing pad 202. For example, an employee can fill out a travel request form, email the form to their manager's computing pad 202, with the reply-to set to the travel coordinator. If the manager approves the travel request and submits the form, it will automatically be routed to the next step without any need for the next email address to be entered on the computing pad 202.

The use of the "Reply-To" header allows one step of the workflow to be done without the need to enter an email address. To allow more than one step workflows, additional mail headers could be defined. For example an email might include headers as follows:

X-Workflow-1: manager_pad@example.com
X-Workflow-2: director_pad@example.com
X-Workflow-3: vp_pad@example.com
X-Workflow-4: travel_arrangements@example.com, employee@example.com In this multiple step workflow embodiment, the computing pads 202 are configured to examine email headers for workflow steps, determine the current step, and when the form is completed forward it, with all workflow email headers to the next step. The example above allows multiple computing pads 202 to be used to collect document signatures, and then the signed form is sent to someone to arrange for travel and also back to the employee who started the workflow. This allows the employee to have a copy and know when the travel has been approved. The employee could list their address at every step as a way to track the form. In some cases, such as a survey or test, the same form should be sent to several people, different answers collected and the results accumulated or processed. For example an instructor might prepare a compound document with examination questions and email it to the computing pads 202 of all the students in the class. Each student might receive the form with the "Reply-To:" header set to the instructors address. Thus when a student finishes the exam the instructor receives it. The instructor will also receive the time for all of the strokes.

A computing pad 202 or other device determines its stage in the workflow by searching for the occurrence of its own email address in the list. To deal with workflows that require review more than once by the same person it may be possible to determine which stage from the message-id headers. Alternatively, an additional email header is used listing the completed workflow steps, e.g. "X-Workflow-Completed: 1, 2." In this case, when each stage of the workflow is finished that stage is added to the email header and forwarded.

The email headers list above can include web services in addition to computing pads 202. For example, after the compound document 400 is viewed and signed by the computing pad 202 with the email address "manager_pad@example.com" it is sent to a signature verification service. This service might examine the strokes and determine if an appropriate manager had signed the document, and if so, attaches some metadata indicating that the signature had been verified. In one embodiment, the service is provided via the stroke and image workflow server 106. In other words, the e-mail is sent to the stroke and image workflow server 106 which in turn sends the compound document 400 to the service for verification.

In one embodiment, the formatted message used to send the compound document 400 includes parameters in the email headers for either the computing pad 202 or for a workflow service. For example, if strokes are sent to a handwriting recognition service, it might be useful specify a language, or to indicate that some of the strokes are 'numeric' rather than arbitrary characters. The following is one example of email headers indicating a workflow with a computing pad 202 and a service:

X-Workflow-1: manager_pad@example.com
X-Workflow-2: mark_recognition@example.com
X-Workflow-2-parameters: language=English & marks=true In this example, the parameters are attribute-value pairs and here specify that the language is English and the strokes as including numeric characters.

In some cases a compound document 400 does not continue to the next step of a workflow, perhaps because the request is denied, or more commonly because more information is required. In one embodiment, additional headers are defined to deal with multiple paths through a workflow, although a form or the computing pad 202 would need to have ways to indicate which path to take. For simple linear workflows forms will either go to the next step or be rejected. Rejected forms can be returned to the sender, perhaps with additional annotation as to why they were rejected. For example, one user may circle an unfilled out region of a form and cause it to be sent back to the previous step.

Thus the computing pad 202 or form should provide means to indicate 'submission' of a form to the next step, and 'rejection' or a return to the previous step. In a linear workflow (one with only one path), specified by the 'X-Workflow-*' headers illustrated above, the 'X-Workflow-Completed:' header can be changed to indicate the previous stage was not really committed. For example, if the headers were:

X-Workflow-1: manager_pad@example.com
X-Workflow-2: director_pad@example.com
X-Workflow-3: vp_pad@example.com
X-Workflow-4: travel_arrangements@example.com, employee@example.com
X-Workflow-Completed: 1, 2

And the email was received by the "vp_pad@example.com". The user of that computing pad 202 could reject the form, perhaps by writing a note 'needs cost estimate' and indicating rejection. The metadata module 312 then changes the 'completed' line removing the last value, so that it now reads: "X-Workflow-Completed: 1" and sending the document to the next required step. In this case, step 2, director_pad@example.com.

In an alternate embodiment, HTTP headers could be used instead of or in addition to e-mail headers. If the compound documents are transported by HTTP, similar information is inserted to support multiple steps in the HTTP headers. In this case, the next step might be a URL to deliver the document to rather than an email address. For example, there might be a line like: "X-Workflow-4: http://www.example.com/travelrequest.cgi" in the email header. In this case, when step 3 is complete instead of using email protocols, the current compound document 400 is sent via an http post command to the URL in the workflow step. Of course if HTTP is being used for document transport, in one embodiment, the formatted message including the compound document 400 is returned to the stroke and image workflow server 106 before being sent to the next stage. This allows the stroke and image workflow server 106 to keep track of the status of the workflow, and allows integration with a content management system or other line of business application.

If the documents are being transported in a manner that supports page images, strokes, and metadata, then the metadata can contain the workflow instructions and status. Again, in the simple case, the metadata includes a list of email address and the current step of the workflow. For the compound document 400 described above, this workflow information could appear in a page metadata directory 404 or a document metadata directory 406.

Methods

Figure 6A:
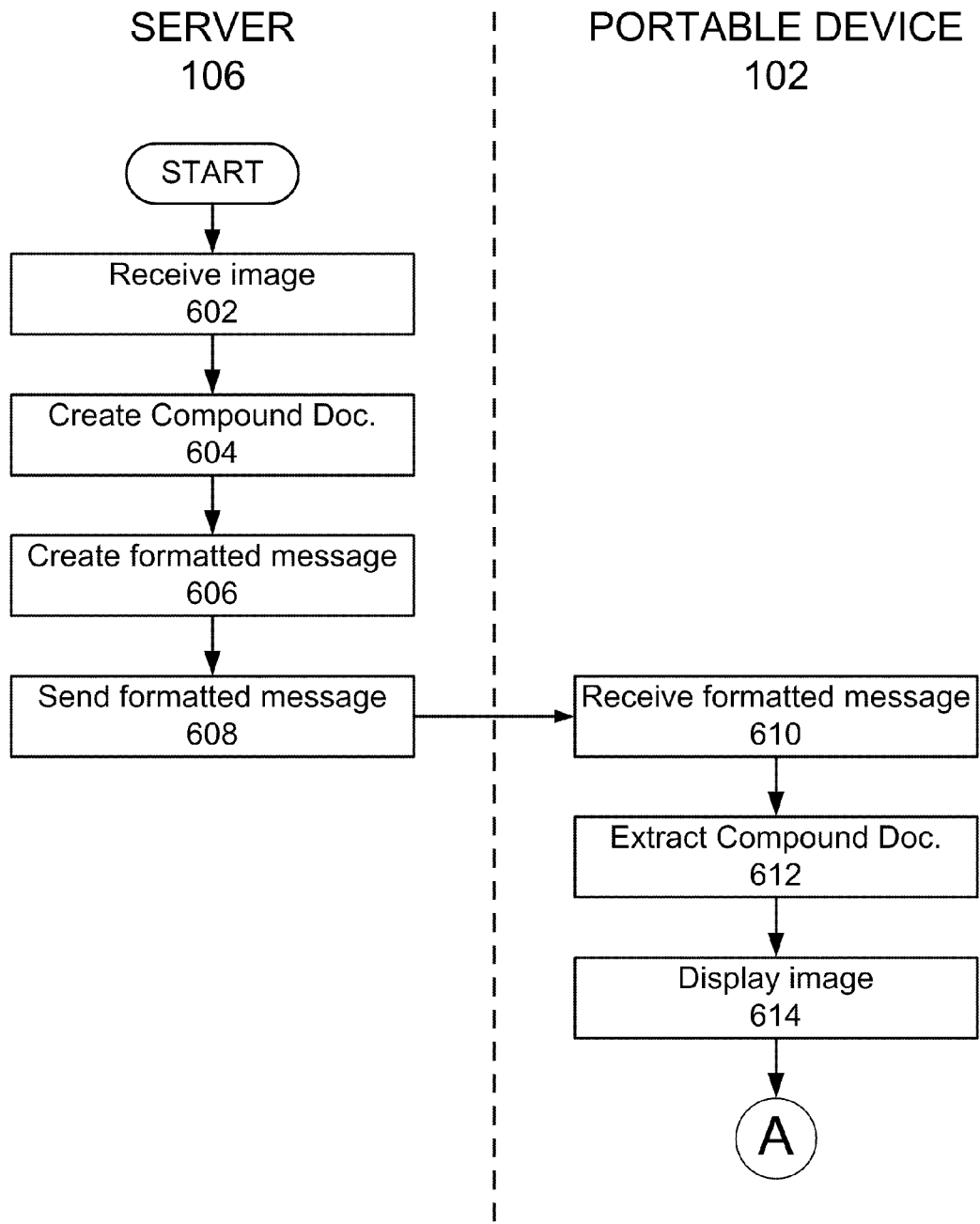
FIGS. 6A and 6B are flowcharts of an embodiment of a method for stroke and image based workflow processing in accordance with the present invention.
Figure 6B:
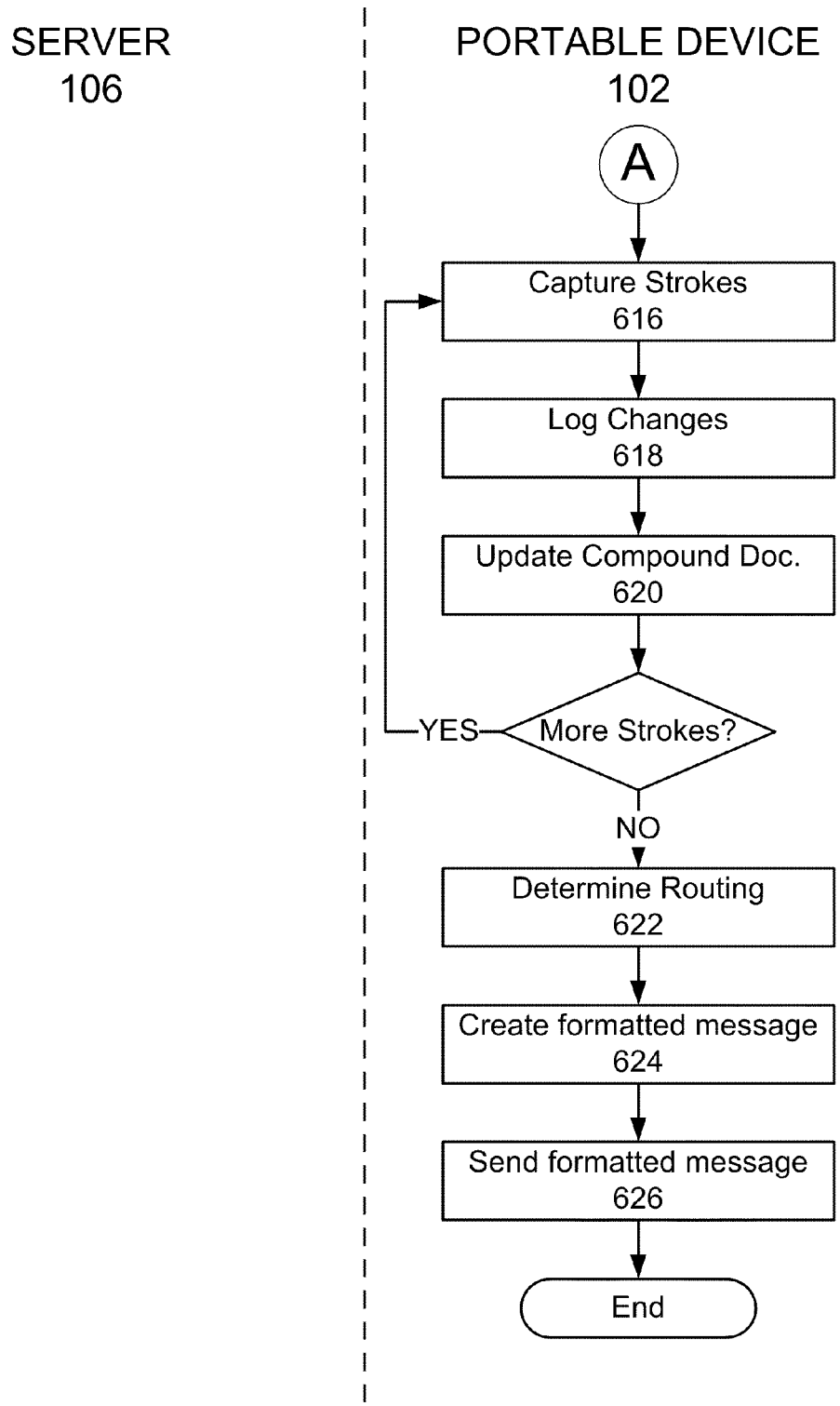

FIGS. 6A and 6B are flow charts of a general method for stroke and image based workflow processing in accordance with the present invention. Referring now to FIG. 6A, the method 600 will be described. The method 600 begins when the stroke and image workflow server 106 (hereafter "server 106") receives 602 an image or group of images. The server 106 then creates 604 a compound document 400. The compound document 400 includes images and metadata as have been described above with reference to FIG. 4. Next the server 106 creates 606 a formatted message. As described above, in one embodiment a formatted message is an e-mail that includes the compound document as an attachment and an e-mail header that specifies the workflow. Next, the server 106 sends 608 the formatted message to the first device specified in the workflow. For example, the server 106 sends 608 the formatted message as an e-mail to the first e-mail address specified in the e-mail header, the document metadata 406 or page metadata 404. Those skilled in the art will recognize that in an alternate embodiment steps 602-608 could be performed by a portable computing device 102 adapted with the functionality to create compound documents 400.

Next, the portable computing device 102 receives 610 the formatted message. Then the portable computing device extracts 612 the compound document 400 from the formatted message. For example, the formatted message is an e-mail message including a WinZip file with a directory, subdirectories and image files. The WinZip file is extracted from e-mail message and the result is the directory, subdirectories and image files. The portable computing device 102 next uses the presentation module 322 to display 614 the images to the user. Referring now also to FIG. 6B, the method continues with the portable computing device 102 capturing 616 strokes as the user moves the stylus or finger over the display device 206. The log module 314 logs 618 the changes and processes the strokes as has been described above, and updates 620 the compound document 400. For example, the log module 314 updates 620 the page log 418 and the document log 408 after a pen-up gesture. Next the method determines 621 whether additional strokes are received at the portable computing device 102. This is determined by either a timeout or input from the user indicating that annotation of an image is complete. If there are more strokes to the input, the method returns to step 616 and repeats steps 616 through 621. If there are no additional strokes to be input, the method continues by determining 622 the routing for the updated compound document 400. In particular, the routing module 318 of the portable computing device 102 determines the routing by examining e-mail headers as has been described above. Next, the portable computing device 102 creates 624 a formatted message including the updated compound document 400. The general process is completed with the portable computing device 102 sending 626 the formatted message created in step 624 to the next workflow recipient in the workflow process. Those skilled in the art will recognize how the process described above with reference to FIGS. 6A and 6B is repeated any number of times as the formatted message and compound document transition between any number of portable computing devices 102 and the server 106. Those skilled the art will also appreciate that in certain circumstances the server 106 may be less involved and the formatted messages are sent via the network 104 and conventional e-mail servers between different portable computing devices 102 representing different steps in the workflow.

Figure 6C:
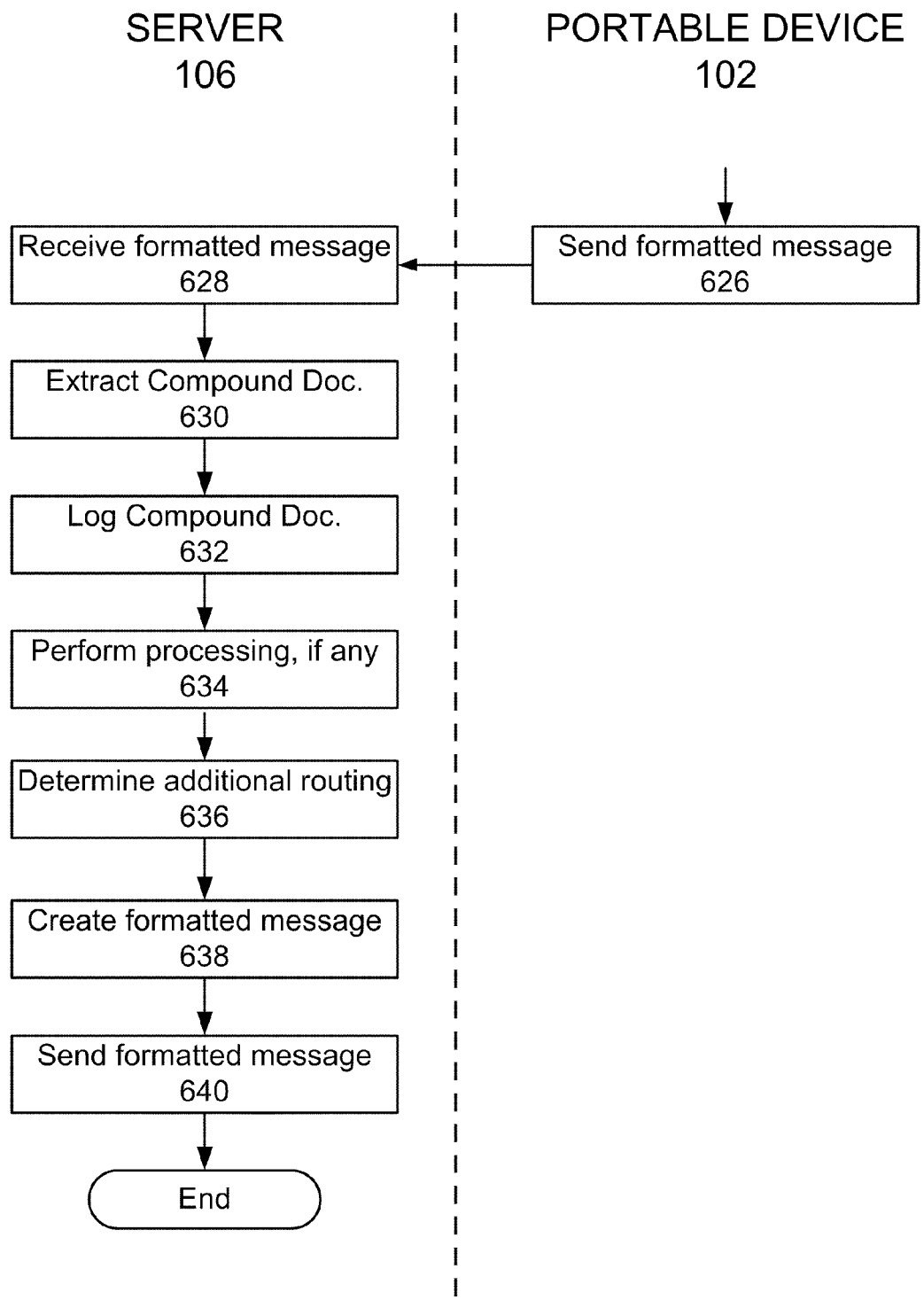
FIG. 6C is a flowchart of an embodiment of a method for logging in a stroke and image based workflow in accordance with the present invention.

Referring now to FIG. 6C, one embodiment of a method for logging activity in a stroke & image based workflow is described. For example, rather than terminating after step 626, the process continues at the server 106. In this embodiment, the server 106 maintains and publishes a log of steps as they are performed for a given workflow. This log can later be used for verification. This is accomplished by having the formatted message or a copy of it transmitted to the server 106 after each processing step. The logging begins with the receipt 628 at the server 106 of the formatted message. The server 106 then extracts 630 the compound document 400 from the formatted message received in step 628. The compound document 400 is then logged 632 at the server 106. For example, the logging module 516 stores a copy of the compound document 400 and its associated metadata along with a timestamp of when the formatted message was received. Next, the server 106 performs processing 634 if any, associated with the server 106 being the recipient of the formatted message. For example, if the formatted message was sent to the server 106 to access the service, the server 106 sends the appropriate portions of the compound document 400 to service providers for processing, receives the results and updates the compound document 400. Various examples of services such as text recognition, signature verification, etc. have been described above. Next, the method determines 636 any additional routing for the formatted message. As has been described above, the e-mail header of the formatted message is examined to determine the next step in the workflow process. Next the workflow module 512 of the server 106 creates 636 a new formatted message with the next destination in the workflow as the addressee of the message. Then the formatted message created in step 638 is provided to the document transmission module 508 of the server and is sent 640 via the communication unit 506.

Figure 6D:
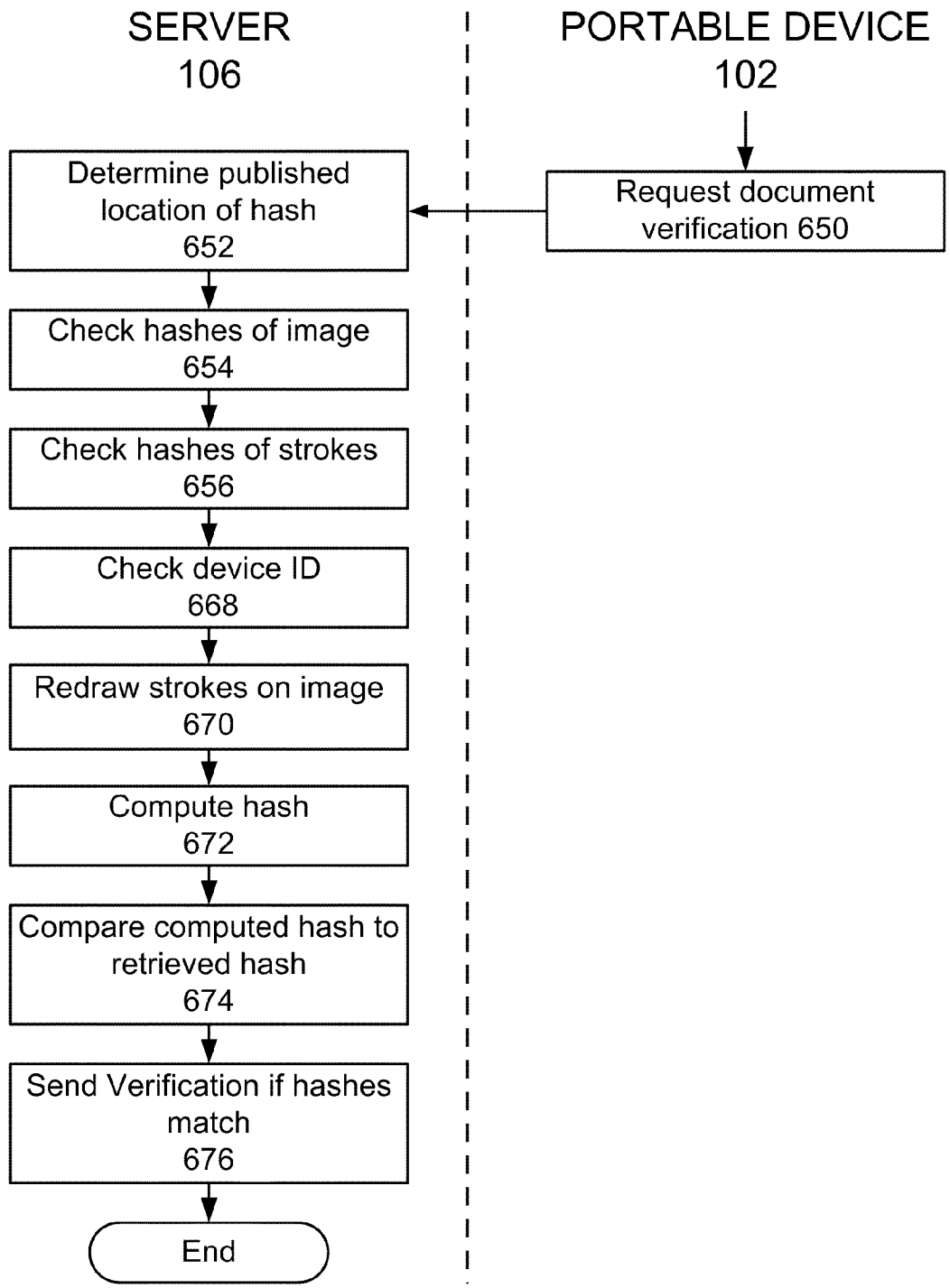
FIG. 6D is a flowchart of an embodiment of a method for verification in a stroke and image based workflow in accordance with the present invention.

Referring now to FIG. 6D, an embodiment of a method for performing verification is described. The process begins with a request 650 for document verification. While this is shown as being initiated at the portable computing device 102, those skilled the art will recognize that the verification requests could be generated and sent from the server 106, the computer 108 or any one of the portable computing devices 102a-n. The request is received at the server 106 and the server determines 652 the published location of a hash value for the compound document 400. Next, the server 106, in particular, the verification module 530 retrieves 654 the hash values for the images in the compound document. Next the verification module 530 checks 656 the hash values of the strokes and retrieves the stroke values from the stroke data 414 of the compound document 400. Then the server checks 668 the device ID to ensure that the device ID is valid. Next, the server 106 redraws 670 the strokes on the image, and computes 672 a hash value for the image and the redrawn strokes. In order to verify the document, the server 106 compares 674 the computed hash values to the retrieved hash values for a match. If the hash values match, the server 106 sends 676 a verification message to the device that requested verification. If the hash values do not match then a message that the compound document 400 is not valid or no confirmation message is sent. Those skilled the art will recognize that the various steps of FIG. 6D may be performed in an order different than that shown. Hashes of raster images may fail to verify because of minor differences in rendering techniques. In this case, the raster image can be retrieved from the portable device log, the hash of that image can be verified to be in the log, and then the raster images can be compared. If the raster images are close enough, a confirmation can be sent. Close enough can be defined in a variety of ways including mean squared error, or analysis by a human observer.

Suppose a form is received that was signed on a computing pad 202, and someone suggests that the signature was just copied from another document and applied to the current form. The logs 408, 418 stored in the compound document 400 are examined to determine what order the signature or other strokes were applied in, and when the signature was made. If the CBI for the log was published in a timely manner, then it is possible to know that the signature was applied before the time of publication. If the portable computing device 102 signed the stroke file with a digital signature then it is possible to confirm that the strokes were added on a particular portable computing device 102, and this removes the opportunity for someone to have added the strokes that didn't have access to the portable computing device 102. Alternatively, if the portable computing device 102 published the CBIs of the signature strokes, then even without a digital signature one can be confident that the strokes were added by the same portable computing device 102 on which other signatures were added. For signature verification purposes, the timing of individual strokes could be analyzed as well, using the time information stored in each stroke. Also a service might use the stroke information in real time to access a signing service which accepted strokes, verified their likely authenticity, and then apply a digital signature to supplement the stroke based signature.

Figure 7:
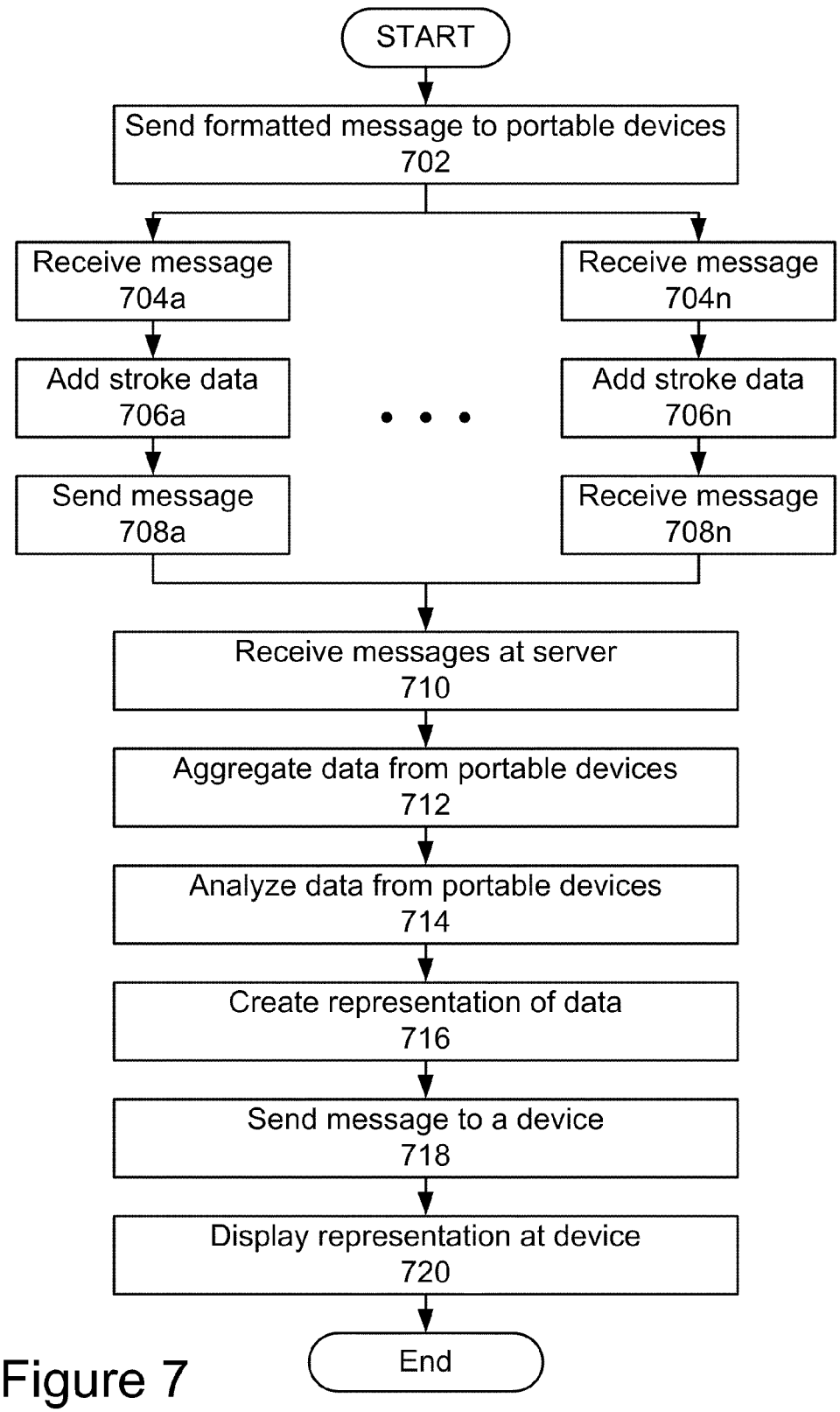
FIG. 7 is a flowchart of an embodiment of a method for stroke and image aggregation and analytics in accordance with the present invention.

Referring now to FIG. 7, one embodiment of a method for stroke and image aggregation and analytics according to the present invention will be described. The process begins by creating and sending 702 a formatted message to a plurality of portable computing devices 102. As has been noted above, this step can be performed by either the stroke and image workflow server 106 in one embodiment, or a particular portable computing device 102 in a second embodiment. For convenience and ease of understanding, the remaining steps in the method will described as if the stroke and image workflow server 106 is the source device that sends the initial formatted message and receives return formatted messages including annotations or additions made by recipient portable computing devices 102a-n; however those skilled in the in the art will recognize that a selected portable computing device (e.g., 802 in FIGS. 8A and 8B) could alternatively perform these steps. Then, a recipient portable computing device 102a receives 704a the formatted message and displays it. The user of the recipient portable computing device 102a adds 706a stroke data. The recipient portable computing device 102a can also add image or text data. Then the portable computing device 102a sends a formatted message back to the stroke and image workflow server 106. These three steps 704, 706 and 708 are repeated at any number of additional computing devices 102b-n as represented by the additional steps 704n, 706n and 708n shown in FIG. 7.

The return formatted messages including the annotations are received 710 at the stroke and image workflow server 106. As has been noted above, steps 710 to 722 may alternatively be performed by one of the plurality of portable computing devices 102. The stroke and image workflow server 106 then extracts the annotations from the return formatted messages and aggregates 712 the annotations. The stroke and image workflow server 106 then analyzes 714 the aggregated annotations or data from the portable computing devices 102. For example, the data may be filtered to extract particular examples to be sent to the portable computing devices 102. Various other types of analysis are described in more detail below. Next, the method creates 716 a representation of the analyzed and filtered data. In one embodiment, this is extraction of particular stroke information and the creation of a revised image including a base image plus the extracted stroke information. Then the stroke and image workflow server 106 creates a message including the representation of the analyzed and filtered data created in step 716 and sends 718 it to a portable computing device 102. For example, the stroke and image workflow server 106 sends 718 the created representation to the portable computing device of an instructor. Finally, the method completes with the display 720 of the created representation at one of the plurality of computing devices 102.

Figure 8A:
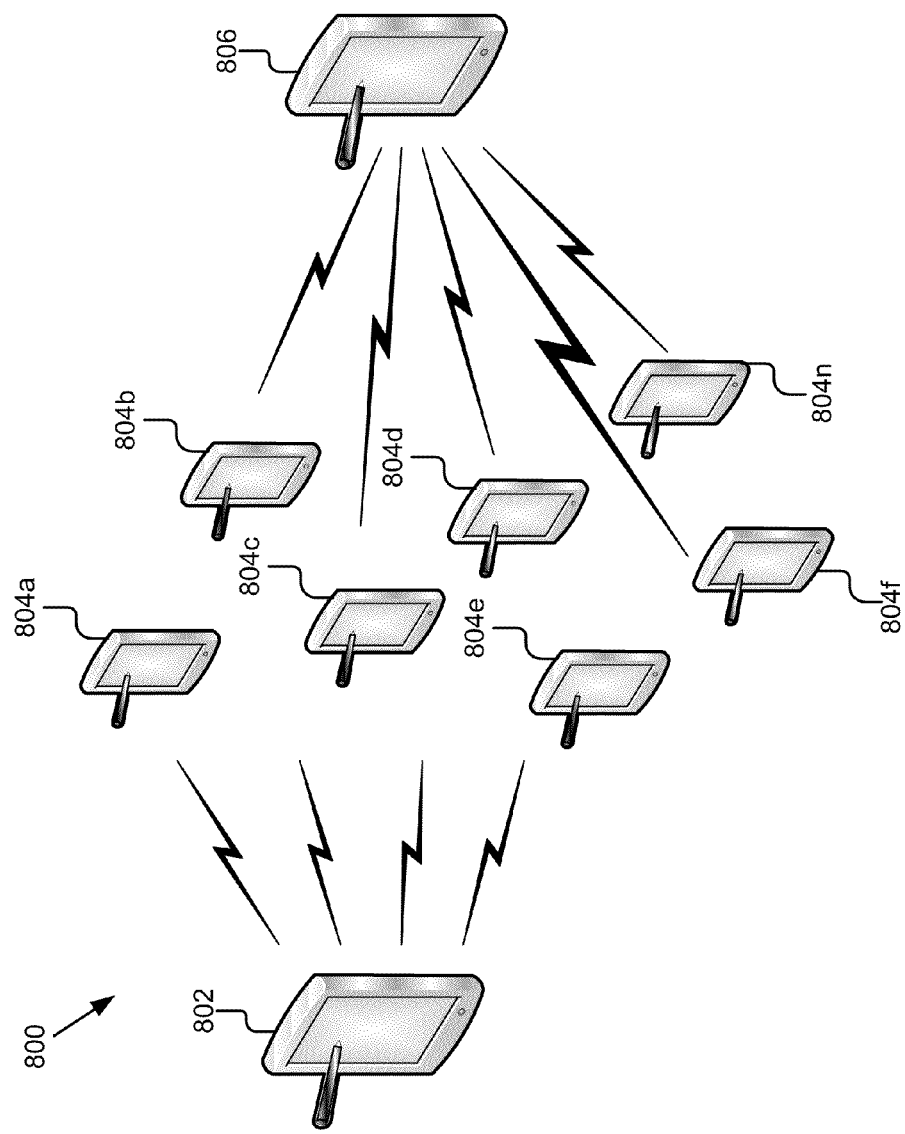
FIGS. 8A and 8B are block diagrams of embodiments of the system for stroke and image aggregation and analytics in accordance with the present invention.

Referring now to FIG. 8A, one example usage scenario for stroke and image aggregation and analytics in accordance with the present invention will be described. FIG. 8A illustrates an example system 800 in which a first portable computing device 802 generates an image and sends it to a plurality of other portable computing devices 804a-n. Users for each of the other portable computing devices 804a-n can retrieve the images sent by the first portable computing device 802 and add their own annotations to the received images. At some later time or in response to a polling signal, the other portable computing devices 804a-n send their annotations and/or images back to another portable computing device 806. Once the other portable computing device 806 receives the annotations, they are analyzed, processed and some are even resent back to the plurality of other portable computing devices 804a-n. Those skilled in the art will recognize that in other embodiments, the communication between the first portable computing device 802 and the plurality of other portable computing devices 804a-n is bidirectional, and that first portable computing device 802 also performs the functions described above for the other computing device 806 and the other computing device 806 is omitted.

FIG. 8A illustrates the computing pad 202 configured to support interactions in a typical meeting or classroom setting. In a classroom setting, it is common to pass a copy of the same information, perhaps a worksheet to the students in the class. The students might write their name on the worksheet and begin answering questions. An instructor may walk around the classroom to examine the student work. At some point the students hand in the worksheets, these worksheets are graded, and the results later returned to the students.

FIG. 8A shows some computing pads 202 configured for this type of group sharing. Initially, the instructor using specially configured instructor pad 802 distributes initial pages to the student computing pad 804a-n. In an alternate embodiment, this is done from the computer 108. The students may each add strokes to their own copy of the pages, yielding different versions of the page perhaps with "their" answers to the questions. The instructor's pad 802 is configured to obtain strokes or images plus strokes from any number of the other pads 804a-n. This allows the instructor to cycle through the student pages without walking around the room, or even if the students are at a remote site.

In instructional and other situations, it is useful for one person to be able to examine the work of multiple other people, typically students. In a classroom situation, this is often done by walking around and looking at what has been written on handed out pieces of paper. Use of the specially configured instructor pad 802 enables alternative methods of viewing work. One pad 802 may be configured to receive strokes from multiple other pads 804a-n. These received strokes may be displayed in multiple different but useful ways as described below with reference to the example in FIGS. 9A-9E.

In a classroom environment, it is useful to limit the ability of one device to see what other devices are doing especially in testing. In this case, only the 'instructors' device 802 is configured to receive information from other pads 804a-n. In a more collaborative environment, for example a meeting or video conference, it may be useful to allow multiple pads to collect information from other pads. In the case of remote classrooms or video conferencing the pads 802, 804a-n may be operating at a large distance from each other. In both classroom and business situations, it can be useful to have pads 802, 804a-n display "shared" pages. In this case strokes made on either pad 802, 804a-n appear on the other at the appropriate size and location. This allows collaborative work such as drawing a figure with input from two distributed people, or signing a contract 'at the same time' by two or more physically separated individuals.

Figure 8B:
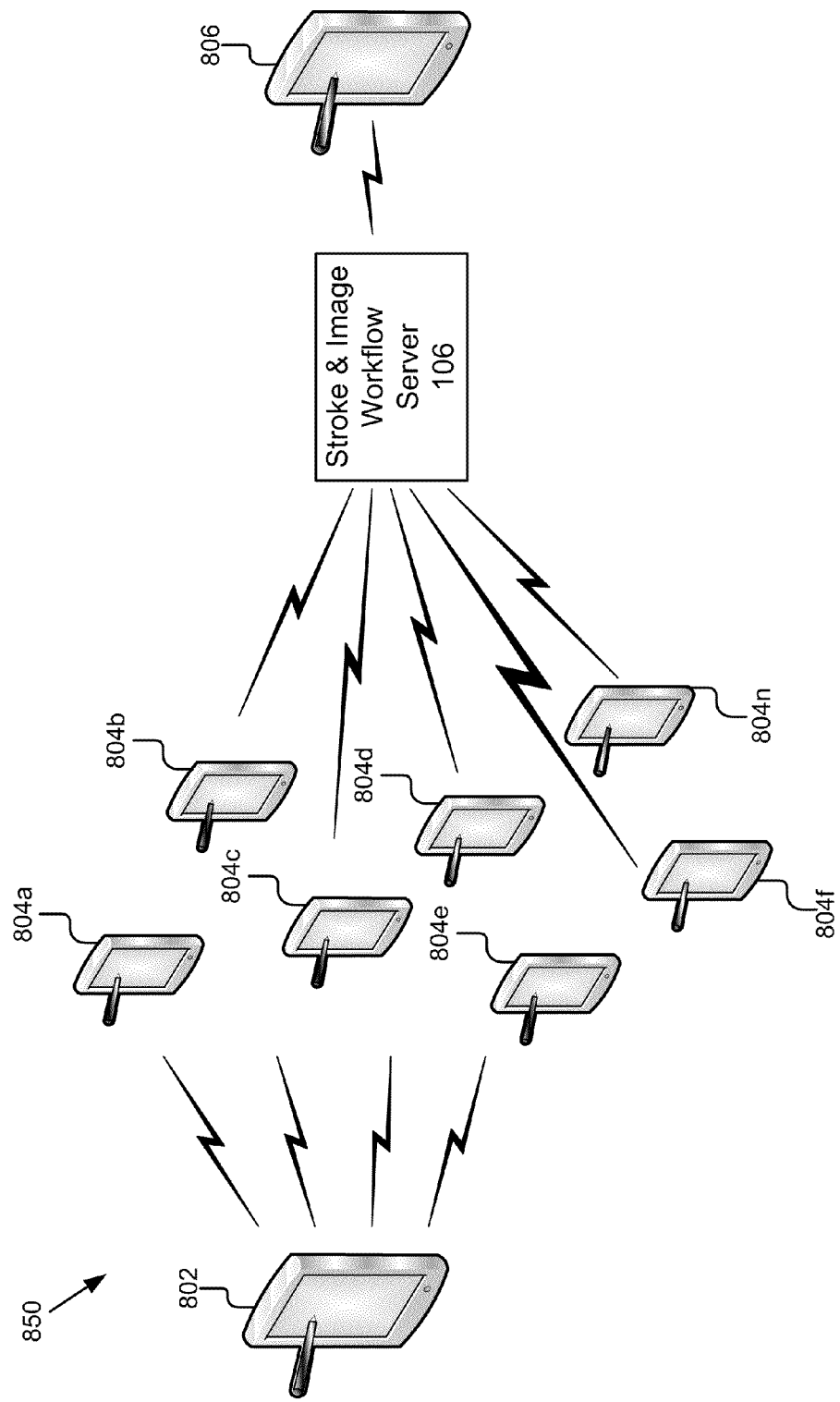

Referring now to FIG. 8B, another embodiment of the stroke and image aggregation and analytics system 850 is shown. This embodiment of stroke and image aggregation and analytics system 850 conforms to the method described above with reference to FIG. 7. This embodiment of the system 850 is similar to that described above with reference to FIG. 8A; however, this embodiment also includes the stroke and image workflow server 106. The system 850 is configured such that a first portable computing device 802 sends a formatted message to the plurality of other computing devices 804a-n. The plurality of other computing devices 804a-n extract image content from the formatted message, display the extracted image, add annotations such as strokes, and prepare and send a return formatted message. However, rather than sending this return formatted message back to the first portable computing device 802, the return formatted messages are sent to the stroke and image workflow server 106. The process of aggregating and analyzing the return formatted messages is performed by the stroke and image workflow server 106. This is particularly advantageous because the stroke and image workflow server 106 has greater computational resources including processor power, memory, and secondary storage; and therefore, is more able to process a greater number of return formatted messages in a shorter amount of time. The stroke and image workflow server 106 then creates the representation of the aggregate and analyzed data, and then sends a formatted message including that representation to the other portable computing device 806. In other embodiments, the aggregate and analyzed data is sent back to the first portable computing device 802 instead of the other portable computing device 806

Referring now to FIGS. 9A-9E, example representations created in accordance with the present invention will be described. The portable computing device 802 includes the presentation module 322 that allows it to display or cycle through images from the other computing devices 804*a-n* in the group (e.g., the student pads), showing exactly what is shown on those computing devices 804*a-n* one at a time, at the actual size of the computing device 804*a-n*. This can be implemented by having the first computing device 802, in particular the creation and storage module 514, poll each of the computing devices 804*a-n* for the current page being displayed. The computing devices 804*a-n* then transmit an entire image of their current display in response. The computing devices 804*a-n* can also transmit the current page by transmitting the background image and the set of strokes or additional image that have been applied to the page. In many cases, a limited set of pages are being viewed and the computing device 804*a-n* may already have the background image. In this case, the computing device 804*a-n* need only send the stroke file representing the new information added since the last time transmission was done. This is may be much quicker in limited bandwidth situations. Furthermore, sending the strokes allows faster update of the display 206 on the first portable computing device 802. If the same background image is being used by a first and a second computing device 802, 804*a-n* viewed in sequence, it may be quicker to erase the strokes from the first portable computing device 802 and draw the strokes from the second computing device 804*a-n* than it is to redisplay the whole image. Note that because strokes and images are stored separately, it is easy to remove strokes and obtain not a blank background, but the original background image.

Figure 9A:
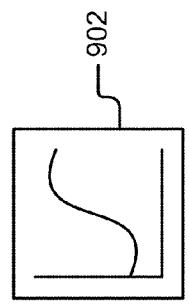
FIG. 9A is a graphic representation of strokes captured by the portable computing systems in accordance with the present invention.
Figure 9A:
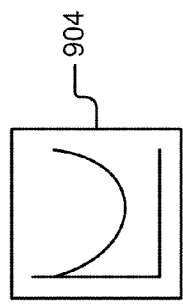
Figure 9A:
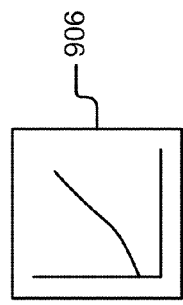
Figure 9A:
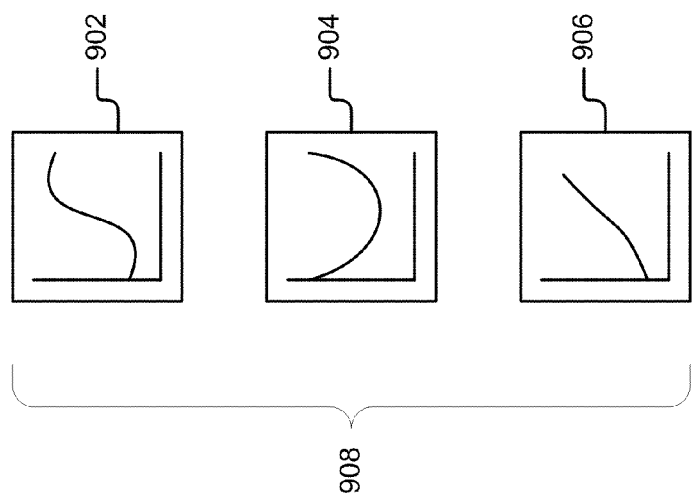

FIG. 9A shows a graphic representation of example strokes captured by the portable computing devices 802, 804*a-n* in accordance with the present invention. In particular, FIG. 9A shows views 908 of the information captured by the other portable computing devices 804*a-c*. In this example, there are three other portable computing devices 804*a-c* that produce a set 908 of images 902, 904, 906, each image displayed on, captured from and sent by a respective one of the portable computing devices 804*a-c*. In particular, this figure shows three pads where students have added a stroke to a base page containing axes for a graph.

In one embodiment, an instructor view, an independent view according to the present invention, includes presenting data from one student pad at a time. Thus the instructor can cycle through the writing by each student and identify which students need help and which students are proceeding correctly. FIGS. 9B-9D show three independent views 902, 904 and 906 showing what is displayed on the computing devices 804*a-c* of three different students. Receiving strokes separately from the background image provides additional information to the portable computing device 802. With a stroke file, the portable computing device 802 can replay the strokes in the order they were added to the student portable computing device 804*a-c*. This allows the instructor to see the steps used to solve the problem more clearly and identify a key point at which the student did not understand the lecture. If the strokes include timing information, they can be replayed at some multiple of speed at which they were created. Alternatively, strokes can be replayed with a fixed amount of time per sample point, or per stroke, or per pixel.

Figure 9F:
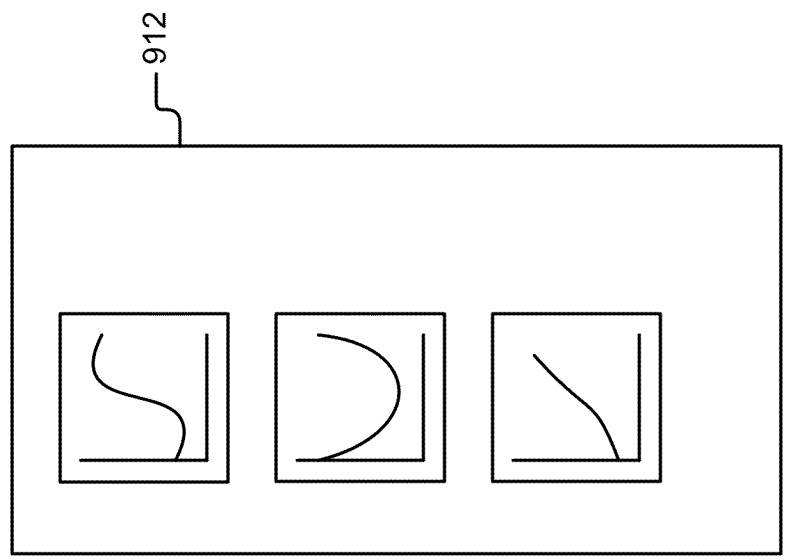
FIG. 9F is a graphic representation of strokes captured and sent to a requesting portable computing system in an overview and in accordance with the present invention.
Figure 9E:
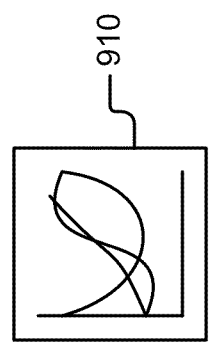
FIG. 9E is a graphic representation of strokes captured and sent to a requesting portable computing system in a combined view and in accordance with the present invention.

FIG. 9E shows a graphic representation of strokes captured and sent to a requesting portable computing device 802 and displayed in a combined view 910 in accordance with the present invention. It is also useful to be able to view information from multiple portable computing devices 804*a-c* at once. One way to see the information from multiple portable computing devices 804*a-c* is to scale the image from each portable computing device 804*a-c* and display them on a single portable computing device 802. This view 910 is shown in FIG. 9E. In this case, the student strokes and background pages have been shrunk and are displayed together on one page. In the combined view 910, one copy of the background page is presented along with the strokes from all or a subset of the student portable computing devices 802. This view can be used to quickly determine if the majority of students understand something, or what kind of mistakes are being made. It can also be used as a quick way to gather data, for example, if everyone checks a box near their preference a quick survey can be completed.

Again, there are advantages to transmitting the stroke information separately from the background images. The receiving portable computing device 802 can scale the background image and display it, and scale the strokes and add them to the previously received background image. This saves both computational resources as well as transmission bandwidth.

The present invention also provides the capability to replay the strokes on the overview image just as for the single selected page image. In fact, if the stroke information includes time information, it is possible to see the sequence in which strokes were added to multiple portable computing devices 804*a-n*. This is useful to identify fast workers, those having trouble, or even copying from one student pad to another.

FIG. 9F is a graphic representation of strokes captured and sent to a requesting portable computing system 802 and shown in an overview 912 according to the present invention. In the overview 912, one copy of the background page is presented along with the strokes from all or a subset of the student portable computing devices 802. This view can be used to quickly determine if the majority of students understand something, or what kind of mistakes are being made. It can also be used as a quick way to gather data, for example, if everyone checks a box near their preference a quick survey can be completed. While the images in FIG. 9F appear larger, this representation is not of the same scale as FIGS. 9A-9E. For example, the display of the portable computing devices 802, 804*a-n* may be the same, and in such a case the overview 912 is scaled to fit the size display of the first portable computing device 802.

In this case there is substantial advantage to transmitting background images and strokes separately. The most useful time to create a combo image is when the background images are identical. In this case the background should be drawn once on the receiving portable computing system 802 and then strokes from multiple portable computing devices 804a-n are added.

In some cases it may be useful to displace the strokes from each portable computing device 804 slightly in combination visualization. For example if a survey question is oriented horizontally asking for users to check somewhere between "strongly disagree" on the left and "strongly agree" on the right, then if several answers are combined, it may be difficult to distinguish between multiple answers in the same location. However, if each answer is displaced slightly vertically, then it is possible to estimate the number of people indicating each location more easily.

Figure 10:
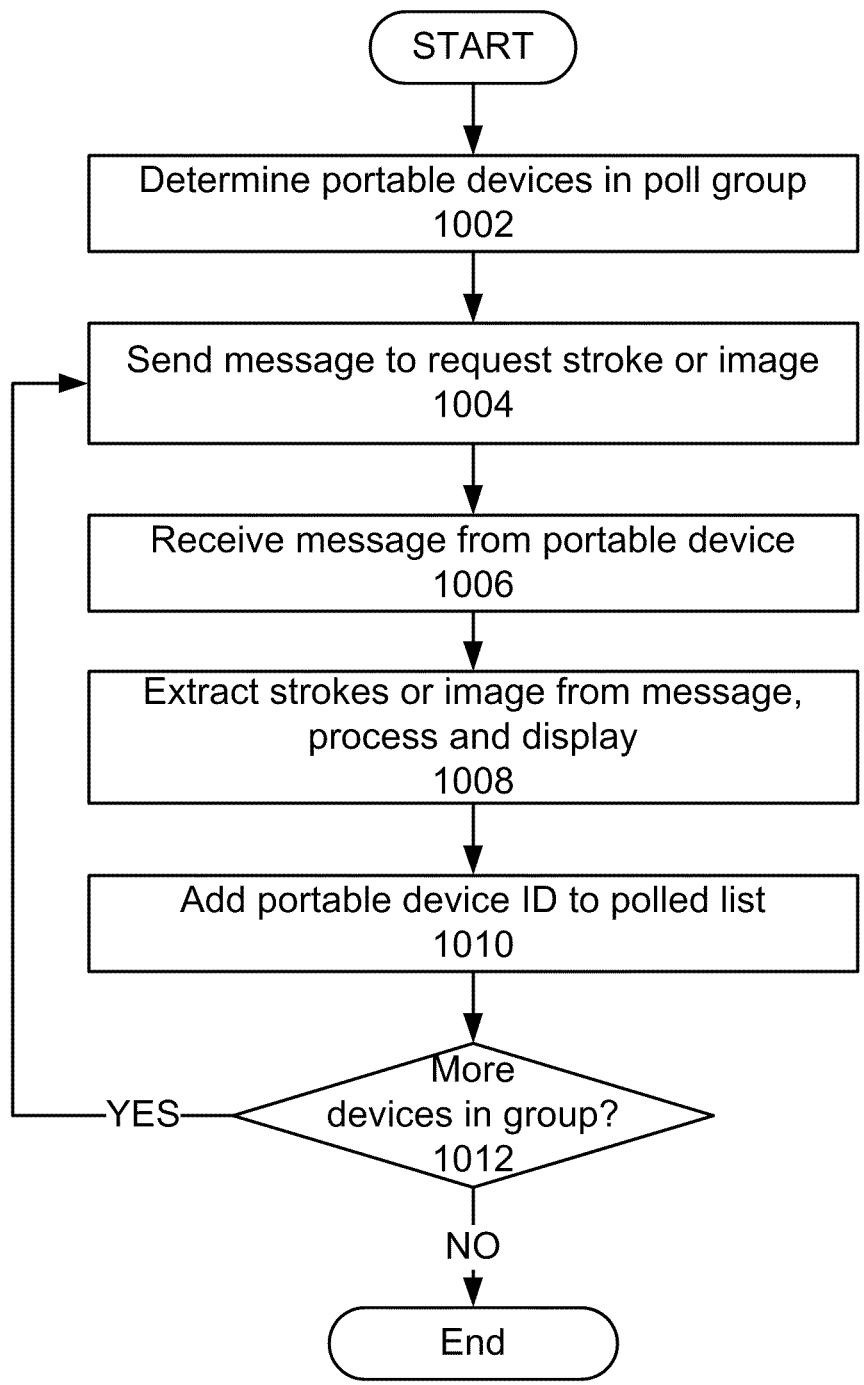
FIG. 10 is a flowchart of an embodiment of a method for stroke and/or image aggregation in accordance with the present invention.

Referring now to FIG. 10 and FIG. 8A, an embodiment of a method for stroke and/or image aggregation in accordance with the present invention is described. The method begins by determining 1002 the portable computing devices 804a-n in a poll group. For example, an instructor could distribute a class identification number to the students in a particular class. The students would in turn provide the class identification number to their portable computing devices 804a-n to gain access to broadcast signals from the instructor with the same identification number. Additionally, the step of determining 1002 also performs real-time evaluation to determine the portable computing devices 804a-n that are within communication range of the portable computing devices 802 used by the instructor. As has been noted above, this determination step 1002 may include the distribution of background images viewed by the users in the pool group. In alternate embodiment, the portable computing devices 804a-n in the pool group have loaded the background images to their respective portable computing devices 804a-n. Next, the method sends 1004 a message to request stroke and/or image data from the portable computing devices 804a-n in the poll group. It should be understood that in one embodiment, only stroke data is requested. In other embodiments, stroke data and image data as well as other metadata is requested and provided in the form of a compound document 400. This is preferably accomplished by sending a formatted message as has been described above. Next, the method receives 1006 return messages from the portable computing devices 804a-n. In the description of this embodiment it is assumed that the portable computing device 802 is performing the steps of FIG. 10. However, in an alternate embodiment including the stroke and image workflow server 106, the steps of FIG. 10 are performed by either the portable computing device 802 or the stroke and image workflow server 106 as will be understood to those of ordinary skill in the art. The portable computing device 802 next extracts 1008 strokes from the message, processes them, and displays them. In one embodiment, the strokes are not processed. In another embodiment, the strokes are processed by scaling them and moving them spatially before display. In yet another embodiment, the strokes are analyzed such as by performing filtering, analytics or other display functions as described herein. In addition, the extracted stroke information is stored as part of the aggregation and storage module 514 as has been described above. In one embodiment, the method maintains a list of the portable devices in the polling group. In step 1010, the method adds the portable device ID to a list of devices that have responded to the message requesting stroke information of step 1004. Next the method continues in step 1012 to determine whether there are more devices in the poll group that have not sent a response message. This can be done by comparing the response list maintained in step 1010 to the list of all devices in the poll group. If there are more devices in the poll group that have not responded, the method returns to step 1004 and repeats steps 1004-1012 for any non-responsive devices. On the other hand if all devices in the poll group have returned messages, the aggregation method is complete and ends.

Figure 11:
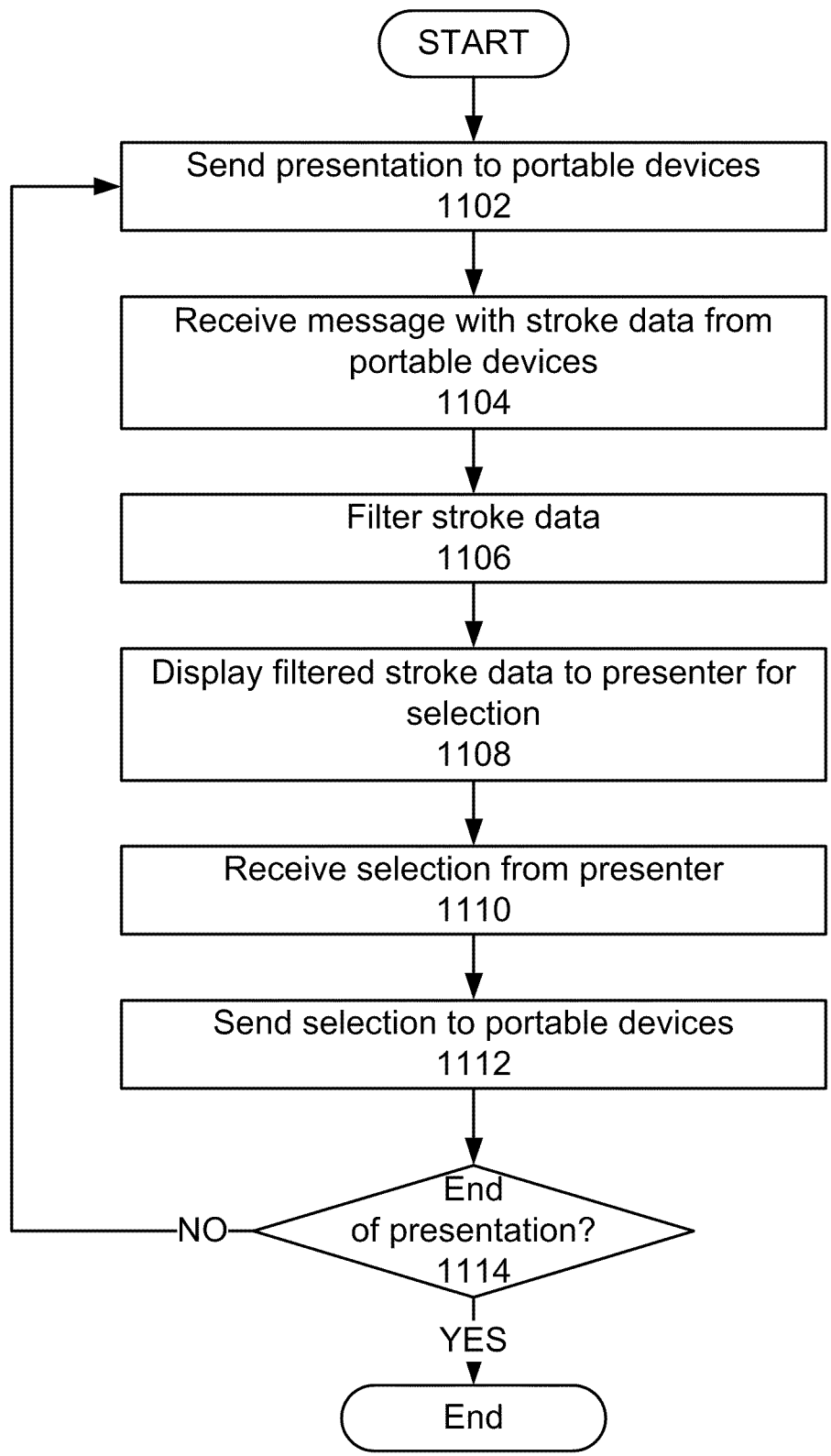
FIG. 11 is a flow chart of an embodiment of a method for stroke and/or image filtering and presentation in accordance with the present invention.

In the above description of FIG. 10 and description of FIG. 11 that follows, the present invention was described as requiring that the stroke and image workflow server 106 send a request or polling message to the plurality of portable computing devices 102a-102n. However, in other embodiments, the plurality of portable computing devices 102a-102n are configured to automatically send updates (strokes) on any page to a particular address without being polled (e.g., by posting to an http server which could be running on the receiving device instead of running 'polling' software.)

Referring now to FIG. 11 and FIG. 8A, an embodiment of a method for stroke and/or image filtering and presentation in accordance with the present invention is described. The method begins by sending 1102 a presentation from a first portable computing device 802 to one or more other portable computing devices 804a-n. For example, a project manager prepares a set of slides for a group meeting using presentation software. These slides are "printed" to their portable computing device 802, and emailed to other attendees of the meeting. Each of the users of the other portable computing devices 804a-n can make edits and annotations and send them to the first portable computing device 802. As the project manager steps though the slides, other attendees look at slides on their own portable computing devices 804a-n, and may step backward to previously presented material to check on items. Anyone in the meeting can make notes on any of the slides. The first portable computing device 802 receives 1104 messages with stroke data from the other portable computing devices 804a-n. For example, at the middle of the presentation, there is a survey to see if the attendees agree that the timeline is realistic, and the goals are correct. The presenter pauses until a sufficient number of people have completed the survey. The method then filters 1106 the stroke data. In one embodiment, this is done automatically by the analytics module 530 by applying rules to the input that has been received. In another embodiment, this is done manually by presenting different views of stroke input to the presenter and allowing selection. Next, the first computing device 802 displays 1108 the filtered stroke data to the presenter. The presenter might use the overview page (FIG. 9E) or the combination view (FIG. 9E) page to filter data. In this embodiment, the presenter inputs a selection of information to be sent to the audience of real-time results. The method receives 1110 the selection from the presenter and the method sends 1112 the selection to the portable computing devices 804a-n. Next the method determines 1114 whether this is the end of the presentation. If not, the method returns to repeat steps 1102-1114 and solicit, filter and present other real-time feedback to the presenter. However if the presentation is complete, the method ends. Depending on the results the presenter may choose to review some material that was not convincing the first time, or to go on with the rest of the presentation. At the end of the meeting, the presenter might receive the notes made on all of the portable computing devices 804a-n, and use that information to create a list of action items, or to improve the presentation for the next group.

Figure 12:
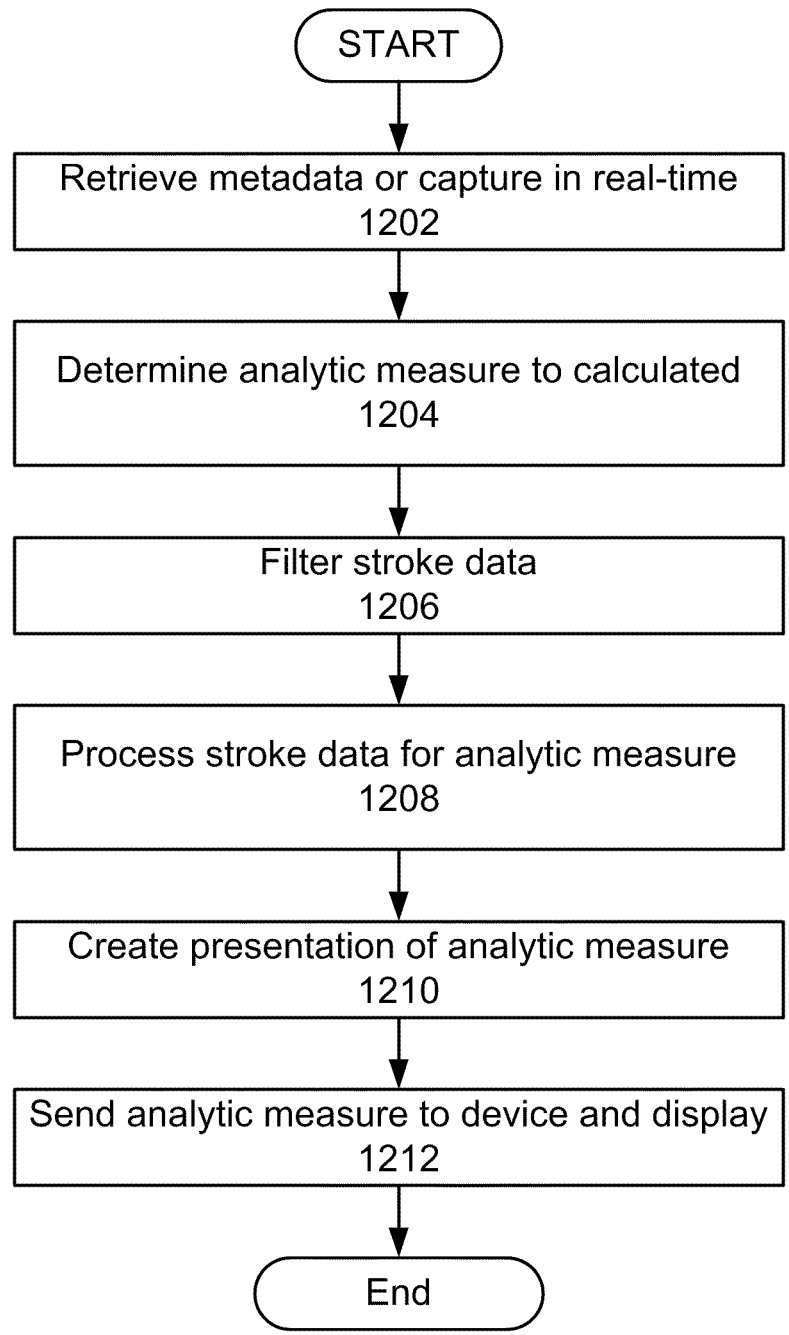
FIG. 12 is a flow chart of an embodiment of a method for stroke and/or image analytics in accordance with the present invention.

Referring now to FIG. 12, an embodiment of a method for stroke and/or image analytics in accordance with the present invention is described. The method begins by retrieving 1202 metadata or capturing real-time strokes or metadata. For example, an instructor is making a presentation and students (local and remote) are taking notes. As students make strokes, a unique device identification of the particular portable computing device 804a-n and the time of the last stroke are sent to the instructor's portable computing device 802. Next the method determines 1204 the analytic measure to be calculated, and filters 1206 the stroke data. The method processes 1208 the stroke data according to the analytic measure determined in step 1204. Then the method creates 1210 a presentation of the analytic measure and sends 1212 the presentation of the analytic measure to the portable computing device 802 for display.

In one embodiment, the instructor's portable computing device 802 computes what fraction of the portable computing devices 804*a-n* have had strokes added in the last two seconds, this percentage might be displayed on the instructor's portable computing device 802. The instructor uses this information in real time to decide to delay changing slides or pause while speaking to allow students to catch up. An instructor might later use this information along with the slides presented to determine what portions of a lecture had the most notes taken on. The same information is used after an exam to determine if students that missed certain questions took notes on those the parts of the presentation that would be most helpful to answer those questions. When an exam is being taken on a pad, stroke time and location information can be collected from all students. The time between the last stroke in the area associated with one problem and the last stroke in the area associated with the next problem is used to determine the time for that problem. An instructor may look at the distribution of time estimated to be spent on each problem and determine if there are problems that are too difficult or topics that weren't covered well enough.

In addition to transferring strokes so that the strokes can be seen on another pad or device, it is useful to collect summary information from the stroke file. This is one example of an analytic measure that can be processed by the present invention. For example, some government forms require estimates of the time required to complete the forms. If stroke data is available one could use the time of the last stroke minus the time of the first stroke as an estimate of the time required to complete the form. Or the time of the last stroke minus the time of the initial viewing of the form could be used as an estimate. It is useful to have such information from a large number of instances to determine the variability in the time required as well.

In some cases it may be useful to transmit the time of strokes and the location of strokes without transmitting the actual strokes. It is possible to preserve privacy and perform stroke analysis by replacing each stroke with its bounding box. This allows detailed analysis of which sections of a form required a lot of time, without giving up the actual information written in each section. Of course, for survey forms it might be valuable to expand the bounding boxes to the size of the question, so as not to give away which option was chosen from a series of check boxes.

Other forms of analysis are useful both in determining the complexity of forms or the difficulty of educational material. Summary information about the number of strokes per page, or strokes per region of the page could indicate where there were a lot of steps to be worked out.

The analytics measurements of the present invention include but are not limited to: the number of strokes in a particular area; the number of forms with strokes in a particular area; the number of strokes being written per second; frequency of use of an "eraser" (assuming the stylus has an erase end, or pad has a way to indicate erase such as an erase button); the number of erasures in an area; time between strokes; which pads are "in use" and which are not (indicated by a stroke being recorded within a particular amount of time). Note that with multiple portable computing devices 804*a-n* 'publishing' log information to other portable computing devices 804*a-n*, it is possible to establish the order in which strokes are written on various portable computing devices 804*a-n* even if the clocks are not accurate. Furthermore, one could detect who copied from whom by watching the pattern of the location of strokes at locations—Student A always writes on an area, then a little later Student B writes in the same area.

The analytics measurements of the present invention also include information from accelerometers, or other device sensors like microphones and button presses. The pad 202 could include magnetic proximity sensors, temperature sensors, capacitive proximity sensors, accelerometers, light sensors, buttons, power switches and/or cameras. Information from these sensors could be sent with a compound document as metadata or even as context information for the strokes being transmitted. The information from these sources may be combined with stroke information for analysis. For example, a pad 202 being passed around during a test for cheating would have a noticeably different accelerometer signature from one that mostly remained on a desk.

The present invention is particularly applicable in any context where student worksheets are used. For example, an instructor prepares a two page worksheet using a word processing program on their personal computer 108. The instructor "prints" the worksheet to the instructor's portable computing device 802. In one embodiment, this is done with 'printer driver' software that selects a portable computing device 802 in the same way a printer is selected. The software creates the format needed for the portable computing device 802, and transmits it to the portable computing device 802. Alternatively, the word processing program might print to some intermediate format like PDF or XPS, which is then converted to a format capable of storing images and strokes, and transferred to the portable computing device 802. The instructor portable computing device 802 is taken to class and at some point the instructor distributes the worksheet from the instructor portable computing device 802 to the student portable computing devices 804*a-n*. In one embodiment, this is done by using Bonjour or another discovery protocol to identify all appropriate portable computing devices 802 within the classroom.

As the students begin to work on the worksheet, the instructor uses the "overview image" to see if all students are making progress. To generate this image, the instructor portable computing device 802 contacts the portable computing devices 804*a-n* that received the worksheet, and obtains the strokes added to the pages. If there are a large number of students there might be more than one overview image. For example the first nine students might have their strokes scaled and added to a scaled back ground image and displayed on a portion of the instructor's portable computing device 802. Then the next nine students might have their strokes displayed on a subsequent page.

The instructor might choose to see one or more student pages at full size, especially if not many strokes have been added to the page. The instructor's portable computing device 802 creates independent page views by displaying the background page at full size and then adding the strokes for one student. Depending on the progress of a student the instructor may choose to offer additional instruction to the whole class, help that one student, or perhaps add strokes to that students' page and have those strokes sent back to the student portable computing device 804*a-n*.

The second page of the worksheet might contain a map, where students have been asked to circle an interesting feature. The instructor uses the combination view to see the collection of all strokes and then shows this view to the class and points out that most of the class choose one particular item, but that an equally good alternative that was spotted by just of few students was available.

After class the instructor examines the stroke timing information and determines that an excessive amount of time was spent on one problem. The instructor simplifies the problem slightly so that the next class will have more time for other problems.

The information about strokes and other sensor input can also be used by developers such as hardware developers and form designers or application developers. If a particular computing pad 202 never reports strokes in one area of the display that may indicate a failure of part of the display or part of the stroke capture circuitry, or miss-calibration of the stroke capture capability. Likewise, if the computing pads 202 are being used by multiple people and one pad consistently indicates strokes more to one side, it may be valuable to examine the computing pad 202 and make some adjustment if a problem is identified. Different versions of forms can be used on multiple computing pads 202, and the strokes collected used to determine if the position of certain parts of the forms makes those parts more or less likely to be filled out. Likewise stroke information can be used to determine if users tend to write outside of the intended stroke capture box on part of the forms, perhaps indicating a need to increase the size of those parts.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A method for stroke aggregation and analysis, the method comprising:
sending a first formatted message including a background image of a page to a plurality of portable computing devices;
receiving a plurality of return messages from the plurality of portable computing devices, the plurality of return messages including stroke data input in relation to the background image of the page;
aggregating, with one or more processors, the stroke data from the plurality of return messages to produce aggregated data;
analyzing, with the one or more processors, the aggregated data to produce analyzed data, the analyzed data including the stroke data received in relation to the background image of the page from each of the plurality of return images;
generating, with the one or more processors, a visual representation of the analyzed data, the visual representation including the stroke data received from each of the plurality of return images, wherein the return images are scaled; and
displaying the visual representation.

2. The method of claim 1, wherein the first formatted message is an email message including a compound document having the background image displayed by the plurality of portable computing devices.

3. The method of claim 1, wherein the plurality of return messages are email messages including stroke data.

4. The method of claim 1, wherein the plurality of return messages are email messages including image data.

5. The method of claim 1, wherein the steps of sending, receiving, aggregating, analyzing, generating and displaying are performed on a portable computing device.

6. The method of claim 1, wherein the steps of receiving, aggregating, analyzing, and generating are performed on a stroke and image workflow server; and the method further comprises sending a display message including the visual representation to a portable computing device, and the displaying step is performed by the portable computing device.

7. The method of claim 1, further comprising sending a polling signal to request stroke data to the plurality of portable computing devices, and wherein the plurality of return messages are sent in response to the polling signal.

8. The method of claim 1, further comprising maintaining a list of the plurality of portable computing devices from which a response to the polling signal has been received.

9. The method of claim 1, wherein aggregating data includes extracting stroke data from the plurality of return messages and storing the stroke data received from the plurality of portable computing devices.

10. The method of claim 1, wherein:
at least one of the return messages includes information from a sensor of one of the plurality of portable computing devices;
aggregating data includes determining a context using the aggregated data; and
analyzing the aggregated data uses this context in addition to stroke data.

11. The method of claim 1, wherein analyzing the aggregated data to produce analyzed data includes determining an amount of time that was required to add the stroke data on each of the plurality of portable computing devices.

12. The method of claim 1, wherein analyzing the aggregated data to produce analyzed data includes determining a percentage of the plurality of portable computing devices from which the stroke data has been received.

13. The method of claim 1, wherein analyzing the aggregated data to produce analyzed data includes determining an amount of time that elapsed to input the stroke data on a section of the background image on each of the plurality of portable computing devices.

14. The method of claim 1, wherein analyzing the aggregated data to produce analyzed data includes summarizing the stroke data from the plurality of portable computing devices.

15. The method of claim 1, wherein analyzing the aggregated data includes filtering the stroke data by receiving a selection from a user of one or more stroke data input in the plurality of return messages.

16. The method of claim 1, wherein the visual representation is an independent view of the stroke data from one of the plurality of portable computing devices.

17. The method of claim 1, wherein the visual representation is a combined view of the stroke data from two or more of the plurality of portable computing devices.

18. The method of claim 1, wherein the visual representation is an overview of the stroke data from two or more of the plurality of portable computing devices.

19. The method of claim 1, wherein the plurality of return messages include timing information about the stroke data.

20. The method of claim 19, wherein displaying the visual representation is a recreation of the stroke data in an order related to each other as they were added on their respective portable computing device.

\* \* \* \* \*